US010701404B2

(12) United States Patent
Song et al.

(10) Patent No.: US 10,701,404 B2
(45) Date of Patent: Jun. 30, 2020

(54) REAL-TIME RESHAPING OF SINGLE-LAYER BACKWARDS-COMPATIBLE CODEC

(71) Applicant: Dolby Laboratories Licensing Corporation, San Francisco, CA (US)

(72) Inventors: Qing Song, Sunnyvale, CA (US); Harshad Kadu, Santa Clara, CA (US); Qian Chen, San Jose, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/329,392

(22) PCT Filed: Aug. 28, 2017

(86) PCT No.: PCT/US2017/048925
§ 371 (c)(1),
(2) Date: Feb. 28, 2019

(87) PCT Pub. No.: WO2018/044803
PCT Pub. Date: Mar. 8, 2018

(65) Prior Publication Data
US 2019/0222866 A1 Jul. 18, 2019

Related U.S. Application Data

(60) Provisional application No. 62/381,233, filed on Aug. 30, 2016.

(30) Foreign Application Priority Data

Aug. 30, 2016 (EP) ..................................... 16186392

(51) Int. Cl.
*H04N 19/98* (2014.01)
*H04N 19/60* (2014.01)
(Continued)

(52) U.S. Cl.
CPC ........... *H04N 19/98* (2014.11); *H04N 19/105* (2014.11); *H04N 19/136* (2014.11);
(Continued)

(58) Field of Classification Search
None
See application file for complete search history.

(56) References Cited

U.S. PATENT DOCUMENTS 5,546,461 A * 8/1996 Ibaraki ................... H04N 5/765
380/217
5,703,793 A * 12/1997 Wise ....................... G06F 13/16
382/232
(Continued)

FOREIGN PATENT DOCUMENTS

JP 2004032551 1/2004
JP 2009538560 11/2009
(Continued)

OTHER PUBLICATIONS

Search report IP.com.*
(Continued)

*Primary Examiner* — Mohammad J Rahman

(57) ABSTRACT

Real-time forward reshaping, comprising selecting a statistical sliding window that indexes with the current frame, having also, a look-back frame and a look-ahead frame, determining whether they are part of the current scene, determining a noise parameter, a luma transfer function and a luma forward reshaping function based on the luma transfer function and the noise parameter within the current scene, selecting a central tendency sliding window of the current frame and the look-back frame within the current scene, and determining a central tendency luma forward reshaping function. The chroma reshaping comprises analyzing statistics for the extended dynamic range (EDR) weights and EDR upper bounds, mapping these to standard (Continued)

dynamic range (SDR) weights and SDR upper bounds based on the central tendency luma forward reshaping function, determining a chroma content-dependent polynomial and a central tendency chroma forward reshaping polynomial and generating chroma MMR coefficients.

32 Claims, 10 Drawing Sheets

(51) Int. Cl.
| | |
|---|---|
| H04N 19/105 | (2014.01) |
| H04N 19/189 | (2014.01) |
| H04N 19/186 | (2014.01) |
| H04N 19/176 | (2014.01) |
| H04N 19/136 | (2014.01) |
| H04N 19/142 | (2014.01) |
| H04N 19/87 | (2014.01) |
| H04N 19/179 | (2014.01) |

(52) U.S. Cl.
CPC ......... *H04N 19/142* (2014.11); *H04N 19/176* (2014.11); *H04N 19/179* (2014.11); *H04N 19/186* (2014.11); *H04N 19/189* (2014.11); *H04N 19/60* (2014.11); *H04N 19/87* (2014.11)

(56) References Cited

U.S. PATENT DOCUMENTS

| | | | | |
|---|---|---|---|---|
| 6,119,213 | A * | 9/2000 | Robbins | H04N 21/4305 375/E7.094 |
| 6,765,962 | B1 * | 7/2004 | Lee | H04N 19/197 375/240.03 |
| 7,016,550 | B2 * | 3/2006 | Alderson | H04N 5/361 250/252.1 |
| 8,811,490 | B2 | 8/2014 | Su | |
| 10,032,262 | B2 | 7/2018 | Kheradmand | |
| 2003/0235220 | A1 * | 12/2003 | Wu | H04N 21/23608 370/535 |
| 2004/0179022 | A1 * | 9/2004 | Nair | G09G 5/06 345/589 |
| 2004/0218830 | A1 * | 11/2004 | Kang | G06T 5/50 382/274 |
| 2007/0160128 | A1 * | 7/2007 | Tian | H04N 5/147 375/240 |
| 2010/0316257 | A1 * | 12/2010 | Xu | G06K 9/00771 382/103 |
| 2010/0322516 | A1 * | 12/2010 | Xu | G06K 9/00778 382/173 |
| 2016/0005153 | A1 | 1/2016 | Atkins | |
| 2016/0366386 | A1 * | 12/2016 | Douady-Pleven | G06T 3/4015 |
| 2017/0186141 | A1 * | 6/2017 | Ha | G06T 5/009 |
| 2017/0221189 | A1 | 8/2017 | Kheradmand | |
| 2019/0110054 | A1 | 4/2019 | Su | |

FOREIGN PATENT DOCUMENTS

| | | |
|---|---|---|
| JP | 2013520687 | 6/2013 |
| JP | 2019523578 | 8/2019 |
| WO | 2007/047758 | 4/2007 |
| WO | 2015128295 | 9/2015 |
| WO | 2017/201139 | 11/2017 |

OTHER PUBLICATIONS

Search report Google search.*

Lu, Taoran et. al., "Implication of high dynamic range and wide color gamut content distribution", Optomechatronic Micro/Nano Devices and Components III. Oct. 8-10, 2007, Lausanne, Switzerland; [Proceedings of SPIE, ISSN 0277-786X], SPIE, Bellingham, Wash, vol. 9599, Sep. 22, 2015 (Sep. 22, 2015), pp. 95990B-95990B, XP060060853, DOI:10.1117/12.2188572 ISBN: 978-1-62841-730M2 section 4 figures 7-10.

Lu, Taoran et. al., "Compression Efficiency Improvement over HEVC Main 10 Profile for HDR and WCG Content", 2016 Data Compression Conference (DCC), IEEE, Mar. 30, 2016 (Mar. 30, 2016), pp. 279 288. XP033072710111 DOI:10.1109/DCC.2016.99 abstract sections 1 and 3 figures 3-6.

Minoo (Arris) K. et al., "Uescnption of the reshaper parameters denvation process in ETM reference software", 23. JCT-VC Meeting; Feb. 19, 2016 to Feb. 26, 2016, San Diego; (Joint Collaborative Team on Video Coding of ISO/IEC JTC1/SC29/WG11 and ITU T SG.16 ); URL: http://wftp3.itu.int/av•arch/jctvc-site/, No. JCTVC-W0031, Jan. 11, 2016 (Jan. 11, 2016), XP030117798, sections 1-4, figures 1-7.

ITU-R BT.1886 "Reference Electro-Optical Transfer Function for Flat Panel Displays Used in HDTV Studio Production" Mar. 2011.

SMPTE ST 2084:2014 "High Dynamic Range EOTF of Mastering Reference Displays".

* cited by examiner

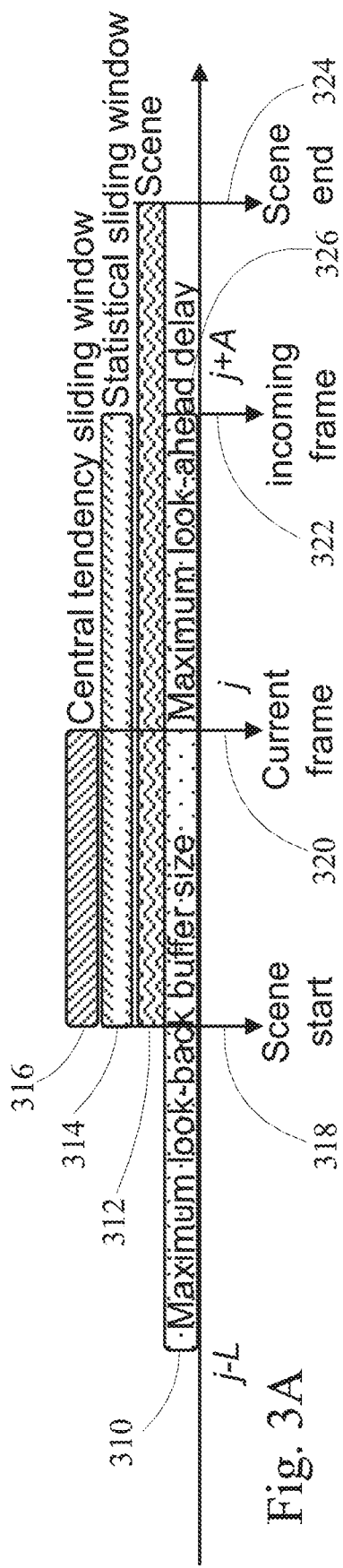
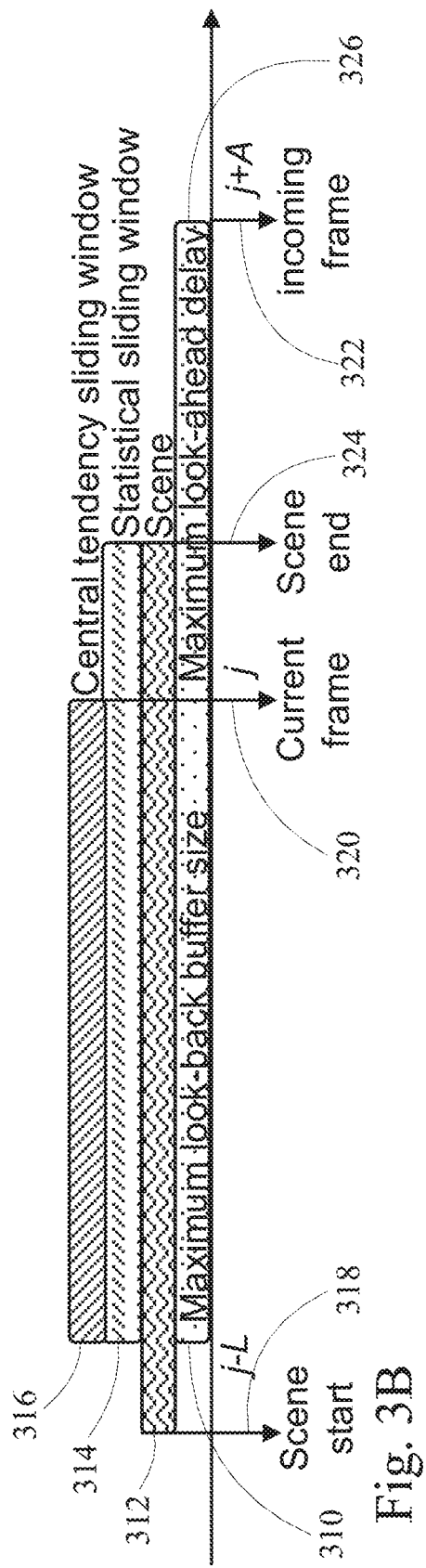
Fig. 3A
Fig. 3B

REAL-TIME RESHAPING OF SINGLE-LAYER BACKWARDS-COMPATIBLE CODEC

CROSS REFERENCE TO RELATED APPLICATIONS

This application claims priority to U.S. Provisional Patent Application No. 62/381,233, filed on Aug. 30, 2016, and European Patent Application No. 16186392.3 filed on Aug. 30, 2016, the disclosures all of which are incorporated herein by reference in their entirety.

TECHNOLOGY

The present invention relates generally to encoding and decoding images. More particularly, an embodiment of the present invention relates to real-time single layer reshaping of backwards compatible encoding and decoding of images.

BACKGROUND

As used herein, the term 'dynamic range' (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR represents a wide DR breadth and may also be referred to as HDR.

In practice, images comprise one or more color components (e.g., luma Y and chroma Cb and Cr) wherein color components are represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such displays thus typify a lower dynamic range (LDR), also referred to as a standard dynamic range (SDR), in relation to HDR or EDR. As the availability of HDR content grows due to advances in capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. As appreciated by the inventors here, improved techniques for encoding and decoding reversible production-quality single-layer video signals that may be used to support a wide variety of display devices are needed.

As used herein, the term "forward reshaping" denotes the process of mapping (or quantizing) an HDR image from its original bit depth to an image of a lower or the same bit depth to allow compressing the image using existing coding standards or devices. In a receiver, after decompressing the reshaped signal, the receiver may apply an inverse reshaping function to restore the signal to its original high dynamic range. As appreciated by the inventors here, improved techniques for image reshaping of high dynamic range images are needed.

A forward reshaping look-up table (LUT) is a table in which the mapping or quantizing of the forward reshaping has been stored.

As used herein, the term backwards compatible denotes hardware and/or software that are designed to function with SDR, SDR with Dolby metadata and HDR interchangeably. If the compressed video bit stream is present, then SDR may be viewed. If SDR and Dolby metadata are contained within the compressed video stream then the video may be viewed in SDR or in HDR. The underlying bit stream may be encoded by any codec, such as AVC, HEVC, VP9, or any future codec.

The term real-time may refer to real-time architectures and/or real-time implementations. Real-time architectures are those in which the data for processing is made available at the time of processing, e.g. there is little to no dependency on data that will not be available at the current time instance, so that data dependency delays are minimized. Real-time implementations are those in which processing may be performed within a fixed time interval, e.g. the average processing time may be performed within a certain number of frames, e.g. optimized algorithms capable of quickly realizing a result. In this way a real-time architecture provides data that is temporally near the time of processing and real-time implementations utilize this temporally near data in algorithms that may be performed within a certain number of frames, i.e. processed quickly. The instant disclosure pertains to both aspects, it is understood that achieving an optimized real-time result may be optimally realized with a real-time implementation working in conjunction with a real-time architecture.

The term single layer denotes a compressed video bit stream. Two different bitstreams may be delivered, the first stream is a compressed video bitstream, such as AVC, HEVC, which contains the compressed pixels information, and is SDR. The bitstreams may be decoded by any legacy device. A second stream has Dolby metadata, which contains a backward reshaping function. With the first stream, video may be watched in SDR. If both the first stream and the second stream are present, the video may be watched in HDR. The first stream, the compressed video bitstream, does not contain the Dolby metadata.

The term central tendency as used herein is a measure used to describe at least one of the average, mean, median, mode, center of distribution, smallest absolute deviation, dispersion, range, variance, standard deviation with kurtosis and the like, e.g. it is a measure of where the middle of the dataset lies. The term linear non-linear combination may be used in referring to the central tendency measure.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIGS. 3A and 3B depict example luma reshapings in accordance with an embodiment of the disclosure;

DESCRIPTION OF EXAMPLE EMBODIMENTS

Figure 1:
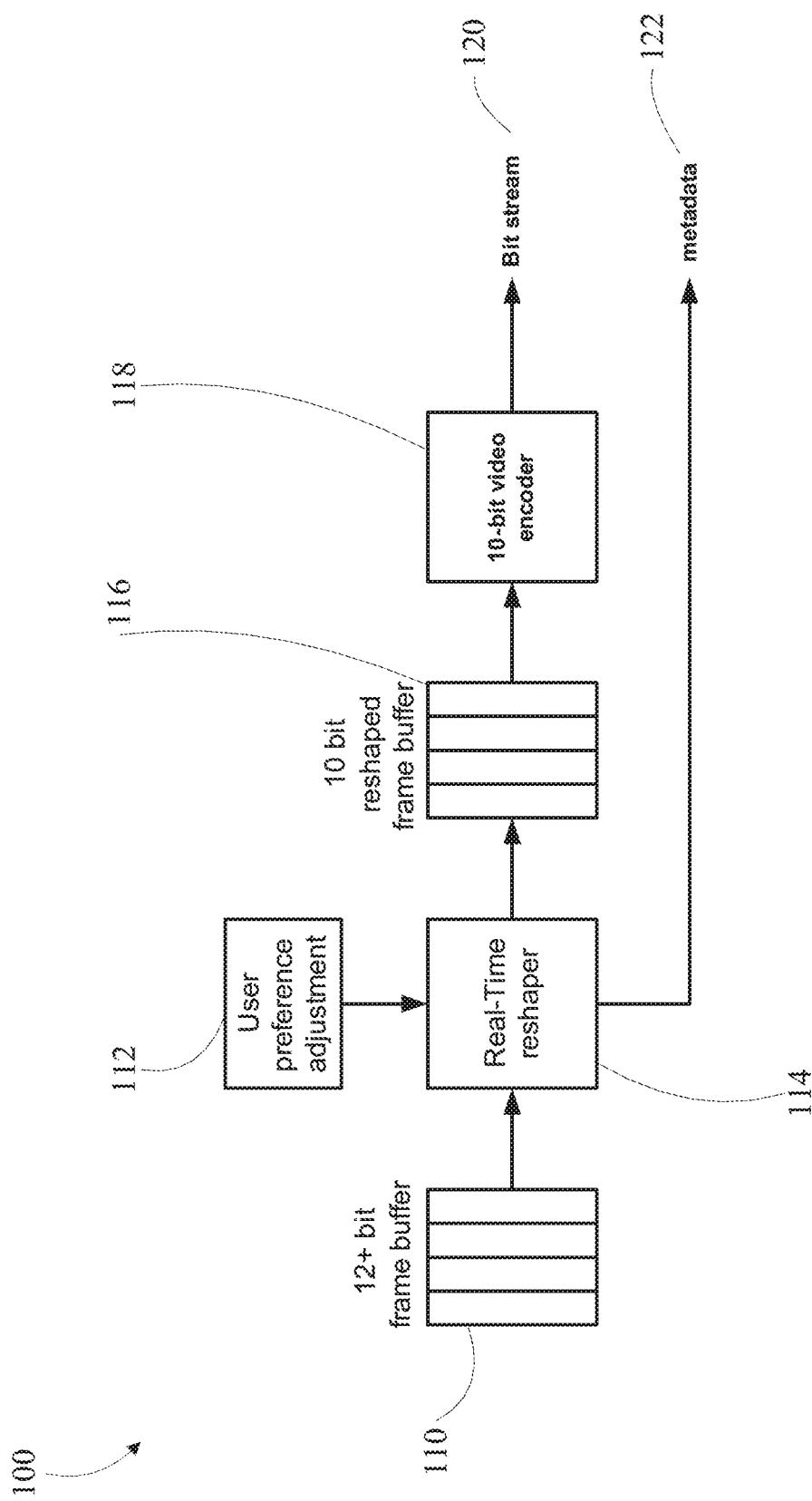
FIG. 1 depicts an example overview in accordance with an embodiment of the disclosure.

Encoding and decoding reversible production-quality single-layer video signals are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

In a first aspect of the disclosure, a method of real-time forward reshaping, comprising, selecting a statistical sliding window having a current frame, at least one look-back frame and at least one look-ahead frame, wherein the statistical sliding window indexes with the current frame. The forward reshaping may include inversible mapping from higher dynamic range (e.g., EDR) to a lower dynamic range (e.g., SDR) or the same dynamic range. Within the first aspect the method further comprises determining statistics of the current frame, the at least one look-back frame and at least one look-ahead frame within the statistical sliding window, including the at least one look-back frame in a current scene if the determined statistics of the at least one look-back frame and the current frame are within a predetermined threshold, excluding the at least one look-back frame from the current scene if the determined statistics of the at least one look-back frame and the current frame are greater than the predetermined threshold or if the at least one look-back frame is not within the statistical sliding window, including the at least one look-ahead frame in the current scene if the determined statistics of the at least one look-ahead frame and the current frame are within the predetermined threshold and excluding the at least one look-ahead frame from the current scene if the determined statistics of the at least one look-ahead frame and the current frame are greater than the predetermined threshold or if the at least one look-ahead frame is not within the statistical sliding window. The first aspect additionally comprises determining at least one noise parameter based on the determined statistics of the current frame, the at least one look-back frame and the at least one look-ahead frame of those frames within the current scene, determining at least one luma transfer function based on the determined statistics of the current frame, the at least one look-back frame and the at least one look-ahead frame of those frames within the current scene, determining at least one luma forward reshaping function based on the at least one luma transfer function and the at least one noise parameter within the current scene, selecting a central tendency sliding window of the current frame and the at least one look-back frame if the at least one look-back frame is within the current scene and determining a central tendency luma forward reshaping function based on the at least one luma forward reshaping function. The predetermined threshold for the statistics may be a percentage, a deviation, an absolute difference or the like. The determined statistics may include a maximum level of maximal values (e.g., pixel values, luma values) within the (frames of the) statistical sliding window, a minimum level of minimal values (e.g., pixel values, luma values) within the statistical sliding window, and a mean level of average values (e.g., pixel values, luma values) within the statistical sliding window. The at least one noise parameter may be determined based on an average of block-based standard deviations within the statistical sliding window. For example, the at least one noise parameter may be determined based on a standard deviation for each of a plurality of bins of pixel values (e.g., luma) in the current frame, the at least one look-back frame and the at least one look-ahead frame of those frames within the current scene, e.g., by taking an average over the frames.

The at least one luma transfer function may be constructed using dynamic tone mapping (DTM) based on the determined statistics. The at least one luma transfer function may be further constructed based on a given slope, a given offset, and a given power for DTM. Determining the at least one luma forward reshaping function based on the at least one luma transfer function and the at least one noise parameter within the current scene may comprise re-allocating a bit depth (in the SDR domain) among input codewords of the luma transfer function based on the at least one noise parameter. The central tendency luma reshaping function may be determined by averaging over luma forward reshaping functions for the current frame and the at least one look-back frame of the central tendency sliding window.

The statistical sliding window indexes when the current frame indexes. The basic setting for this statistical sliding window is to have A look-ahead frames and L look-back frames. If frames inside this statistical sliding window are not in the same scene as the current frame, they will be excluded. With respect to the look-ahead frames, if there are frames in a future scene, e.g. not within the current scene, those are excluded. With respect to the look-back frames, if there are frames in a previous scene, e.g. not part of the current scene, those are also excluded. In other words, in this statistical sliding window approach the frames are considered as being in the current scene if they are within the same scene as current frame inside current statistical sliding window.

The luma transfer function may include dynamic tone mapping (DTM), color volume transformations, mapping of perceptual quantization signals to gamma and the like.

In a second aspect of the disclosure, a method of real-time forward reshaping, comprising, analyzing statistics for at least one of extended dynamic range (EDR) weights and EDR upper bounds of the current frame, the at least one look-back frame (if any) and optionally the at least one look-ahead frame (if any) within the statistical sliding window, mapping the at least one of extended dynamic range (EDR) weights and the EDR upper bounds to a respective standard dynamic range (SDR) weights and SDR upper bounds based on the central tendency luma forward reshaping function, determining at least one chroma content-dependent polynomial (e.g., a chroma frame solution comprising at least one chroma content-dependent polynomial), determining a central tendency chroma forward reshaping polynomial based on the at least one chroma content-dependent polynomial of the statistical sliding window and generating a set of chroma multivariate multiple regression coefficients based on the central tendency chroma forward reshaping polynomial.

In a third aspect of the disclosure, a method of real-time forward reshaping, comprising, selecting a statistical sliding window having a current frame and at least one look-back frame, wherein the statistical sliding window indexes with the current frame. Within the third aspect the method further comprises determining statistics of the current frame and the at least one look-back frame within the statistical sliding window, including the at least one look-back frame in a current scene if the determined statistics of the at least one look-back frame and the current frame are within a predetermined threshold and excluding the at least one look-back frame from the current scene if the determined statistics of the at least one look-back frame and the current frame are greater than the predetermined threshold or if the at least one look-back frame is not within the statistical sliding window. The third aspect additionally comprises determining at least one noise parameter based on the determined statistics of the current frame and the at least one look-back frame of those frames within the current scene, determining at least one luma transfer function based on the determined statistics of the current frame and the at least one look-back frame of those frames within the current scene, determining at least one luma forward reshaping function based on the at least one luma transfer function and the at least one noise parameter within the current scene, selecting a central tendency sliding window of the current frame and the at least one look-back frame if the at least one look-back frame is within the current scene and determining a central tendency luma forward reshaping function based on the at least one luma forward reshaping of the central tendency sliding window.

In a fourth aspect of the disclosure, a method of real-time forward reshaping, comprising, analyzing statistics for EDR upper bounds of the current frame, the at least one look-back frame (if any) within the statistical sliding window, and optionally the at least one look-ahead frame (if any) mapping the EDR upper bounds to SDR upper bounds based on a central tendency of the EDR upper bounds and the central tendency luma forward reshaping function, determining a chroma content-dependent polynomial of the statistical sliding window and generating a set of chroma multivariate multiple regression coefficients based on the chroma content-dependent polynomial.

In a fifth aspect of the disclosure, a method of real-time forward reshaping, comprising, analyzing statistics for extended dynamic range (EDR) upper bounds of the current frame, the at least one look-back frame (if any) and optionally at least one look-ahead frame (if any) within the statistical sliding window, mapping the EDR upper bounds to a respective standard dynamic range (SDR) upper bounds based on the central tendency luma forward reshaping function, determining at least one chroma content-dependent polynomial (e.g., a chroma frame solution comprising at least one chroma content-dependent polynomial) based on the SDR upper bounds, determining a central tendency chroma forward reshaping polynomial based on the at least one chroma content-dependent polynomial of the statistical sliding window and generating a set of chroma multivariate multiple regression coefficients based on the central tendency chroma forward reshaping polynomial.

In a sixth aspect of the disclosure, an apparatus that forward reshapes in real-time, comprising, a statistical sliding window generator that selects a sliding window of a current frame, at least one look-back frame and at least one look-ahead frame, a statistical assessor coupled to the statistical sliding window generator that determines statistics for the current frame, the at least one look-back frame and the at least one look-ahead frame of the statistical sliding window, a scene cut detection monitor coupled to the statistical sliding window generator that determines based on an output of the statistical assessor of the current frame a current scene, and determines whether the at least one look-back frame is part of the current scene and whether the at least one look-ahead frame is part of the current scene, In a fifth aspect of the disclosure a luma transfer function mapper coupled to the scene cut detection monitor that determines a luma transfer function mapping curve based on the determined statistics for the at least one current frame, the at least one look-back frame if within the current scene and the at least one look-ahead frame if within the current scene, a noise detector coupled to the scene cut detection monitor that determines a noise parameter based on the determined statistics of the current frame, the at least one look-back frame if within the current scene and the at least one look-ahead frame if within the current scene, a luma forward reshaper coupled to the luma transfer function mapper and the noise detector that determines at least one luma forward reshaping function based on the at least one luma transfer function and the at least one noise parameter within the current scene, a central tendency sliding window generator that selects a central tendency sliding window of the current frame and the at least one look-back frame if part of the current scene and the at least one look-back frame if part of the current scene and a central tendency luma forward reshaper coupled to the luma forward reshaper that determines a central tendency luma forward reshaping function based on the at least one luma forward reshaping function of the central tendency sliding window. This aspect may also comprise a backward reshaper that inverts the luma forward reshaping function.

In a seventh aspect of the disclosure, an extended dynamic range analyzer that analyzes statistics for at least one of EDR weights and EDR upper bounds of the current frame, the at least one look-back frame (if any) and optionally the at least one look-ahead frame (if any) within the statistical sliding window and a bridge mapper coupled to the extended dynamic range analyzer that maps the at least one of EDR weights and the EDR upper bounds to a respective standard dynamic range (SDR) weights and SDR upper bounds based on the central tendency luma forward reshaping function. The sixth aspect of the disclosure also comprises a chroma frame solver coupled to the bridge mapper that determines at least one chroma content-dependent polynomial (e.g., a chroma frame solution comprising at least one chroma content-dependent polynomial), a chroma polynomial linear non-linear combiner coupled to the chroma frame solver that determines a central tendency chroma forward reshaping polynomial based on the at least one chroma content-dependent polynomial of the statistical sliding window and a chroma reshaper coupled to the chroma polynomial linear non-linear combiner and configured to receive the reshaped luma to determine a reshaped chroma and a chroma multivariate multiple regression (MMR) determiner coupled to the chroma polynomial linear non-linear combiner that generates a set of chroma MMR coefficients based on the central tendency chroma forward reshaping polynomial.

In an eighth aspect of the disclosure, an apparatus that forward reshapes in real-time, comprising, a statistical sliding window generator that selects a sliding window of a current frame and at least one look-back frame, a statistical assessor coupled to the statistical sliding window generator that determines statistics for the current frame and the at least one look-back frame of the statistical sliding window, a scene cut detection monitor coupled to the statistical sliding window generator that determines based on an output of the statistical assessor of the current frame a current scene, and determines whether the at least one look-back frame is part of the current scene, a luma transfer function mapper coupled to the scene cut detection monitor that determines a luma transfer function mapping curve based on the determined statistics for the at least one current frame and the at least one look-back frame if within the current scene, a noise detector coupled to the scene cut detection monitor that determines a noise parameter based on the determined statistics of the current frame and the at least one look-back frame if within the current scene, a luma forward reshaper coupled to the luma transfer function mapper and the noise detector that determines at least one luma forward reshaping function based on the at least one luma transfer function and the at least one noise parameter within the current scene, a central tendency sliding window generator that selects a central tendency sliding window of the current frame and the at least one look-back frame if part of the current scene and the at least one look-back frame if part of the current scene and a central tendency luma forward reshaper coupled to the luma forward reshaper that determines a central tendency luma forward reshaping function based on the at least one luma forward reshaping function of the central tendency sliding window.

In an ninth aspect of the disclosure, an extended dynamic range analyzer that analyzes statistics of an EDR upper bound within the statistical sliding window of the current frame, the at least one look-back frame (if any) and the at least one look-back frame (if any) within the statistical sliding window, a bridge mapper coupled to the extended dynamic range analyzer that maps the EDR upper bound to an SDR upper bound based on the central tendency luma forward reshaping function, a chroma frame solver coupled to the bridge mapper that determines at least one chroma content-dependent polynomial (e.g., a chroma frame solution comprising at least one chroma content-dependent polynomial), a chroma reshaper coupled to the chroma frame solver and configured to receive the reshaped luma to determine a reshaped chroma and a chroma multivariate multiple regression (MMR) determiner coupled to the bridge mapper that generates a set of chroma MMR coefficients.

As used herein, the term MMR refers to a multiple-color channel, multiple regression, predictor, first discussed in U.S. Pat. No. 8,811,490, by G-M. Su et al., which is incorporated herein by reference, wherein in an image with multiple color components, a pixel of one color component may be predicted using a linear and/or non-linear combination of pixel values from the multiple color components.

INTRODUCTION

Conventional architectures for real-time single layer backwards compatible (SLBC) codecs typically generate a reference standard dynamic range (SDR) through a live content mapping unit and use approximation to generate the SDR which also makes the SDR reversible. An approximation is performed to ascertain an extended dynamic range (EDR) data set. This approach may be computationally intensive and result in delays. The direct generation of a reversible SDR may be most optimally achieved by utilizing data temporally close to the current frame and utilizing a technique in which the average processing time is within a specific number of frames.

FIG. 1 depicts a real-time reshaper in SLBC 100 that may receive a 12+ bit camera image in a frame buffer 110 that may be a ring buffer memory or the like. The real-time reshaper 114 may utilize user, e.g. shader, preference input 112 such as lift, gain gamma (LGG) or slope offset power (SOP). The real-time reshaper 114 may reshape the input signal into a 10-bit domain according to neighboring frames' statistics, store the 10 bit reshaped frame in a buffer 116, that may be a ring buffer memory or the like, and output the 10 bit video to an encoder 118 to output a bit stream 120. The real-time reshaper 114 may output metadata 122. The forward and backward reshaping functions may be determined in real-time.

The reshaped frames may be stored in a 10-bit reshaped frame buffer that may be a ring buffer memory or the like, which a video encoder (e.g. high efficiency video coding (HEVC)) may fetch and encode. The metadata reference picture unit (RPU) signal may be output from the real-time reshaper. It may be possible to add a muxing module if the bit stream and metadata are to be muxed. It is understood by those in the art that the number of incoming and outgoing bits may be arbitrarily set.

Among the challenges for the real-time reshaper may be highly dynamic scene and user adjustments. Originally, single-layer backward compatible codecs were constructed as scene-based to facilitate the video compression and for temporal consistency for motion compensation. To perform the real-time reshaping, a new architecture and algorithm are proposed in this disclosure.

Figure 2:
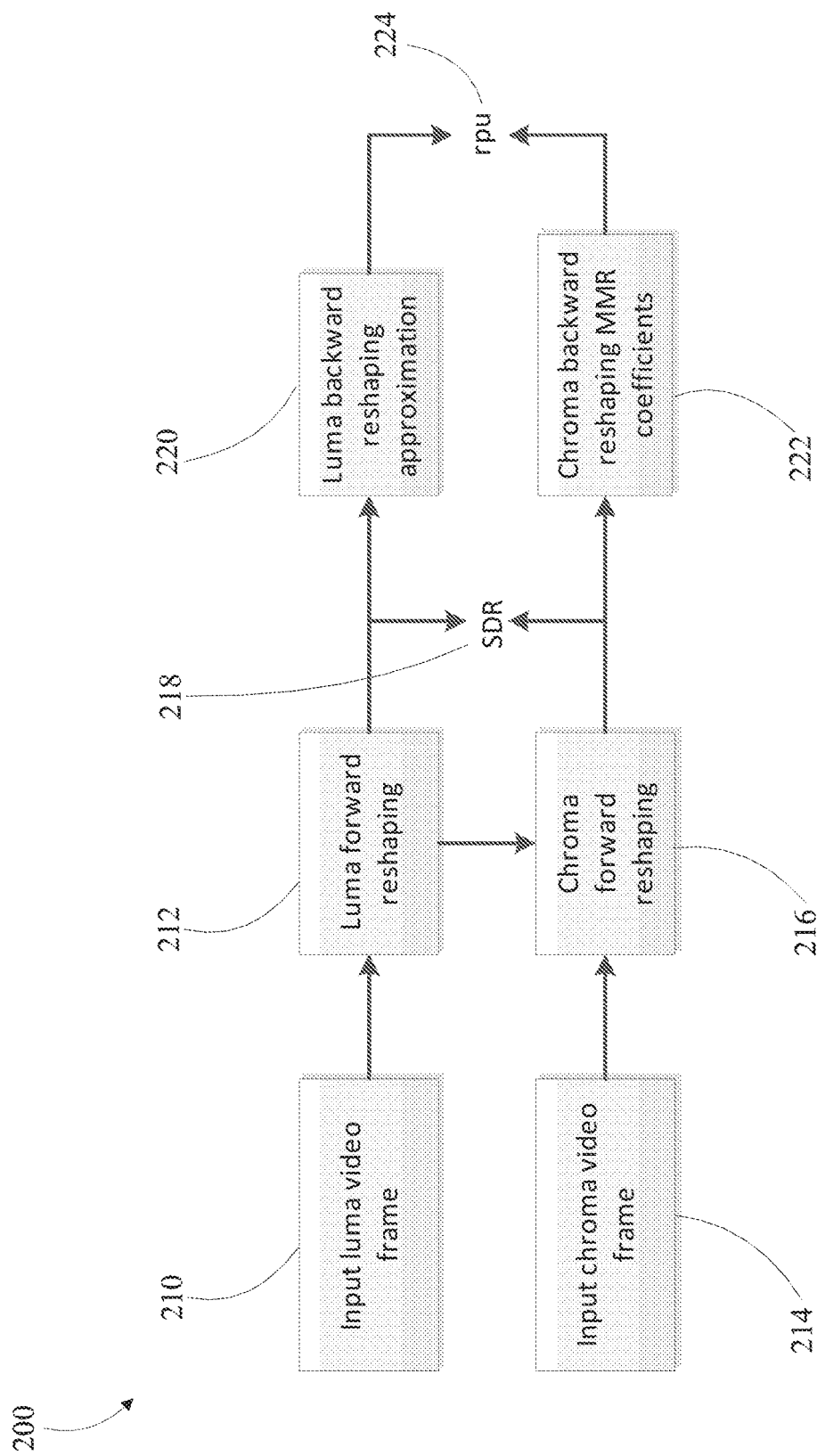
FIG. 2 depict example real-time reshaper in accordance with an embodiment of the disclosure.

FIG. 2 depicts an overall reshaping flow 200. In this example flow a luma video frame is input 210 and a forward reshaping of the luma is determined 212 utilizing statistical and central tendency sliding windows which will be discussed in detail below. In parallel to the luma video frame input, a chroma video frame is input 214. A luma forward reshaping function is utilized to determine the chroma forward reshaping function 216. Utilizing the luma reshaping function and the chroma reshaping function a standard dynamic range (SDR) output 218 is realized.

Luma backward reshaping is an inverse function of the luma forward reshaping function 220. Chroma backward reshaping utilizes chroma multivariate multiple regression (MMR) coefficients 222 based on the chroma forward reshaping function. The forward reshaped SDR luma, the reshaped SDR chroma and the chroma MMR components are utilized to determine the backward reshaped EDR chroma.

Individual frames have a set of statistics associated with that frame. As time moves forward from a look-back frame to a look-ahead frame, if the frame statistics change a scene boundary is detected. The statistics for the frames are compared and scene transitions are determined. Frames with similar statistical characteristics are grouped into a scene. In this context frames having similar statistical characteristics may be assessed by having those statistical characteristics differ by less than a predetermined threshold. If the statistical characteristics are greater than the predetermined threshold, the frames may be considered non-similar and may belong to different scenes.

A frame based statistical sliding window, FIGS. 3A and 3B, is utilized which indexes when a current frame indexes. The basic setting for this statistical sliding window is to have A look-ahead frames and L look-back frames. If frames inside this statistical sliding window are not in the same scene as the current frame, these frames will be excluded. With respect to the look-ahead frames, if there are frames in a future scene, e.g. not in the current scene, those are excluded. With respect to the look-back frames, if there are frames in a previous scenes, e.g. not in the current scene, those are also excluded. In other words, in this statistical sliding window approach the frames are in the current scene if they are within the same scene as the current frame inside the current statistical sliding window.

The statistical sliding window is constrained in the look-back direction by the scene start and a maximum look-back buffer size, the statistical sliding window is constrained in the look-ahead direction by the scene end and the maximum look-ahead delay. In this example the buffer extends backward from the current frame j, back to look-back frame j-L and extends ahead from the current frame j to look-ahead frame j+A. The statistical sliding window is bounded in the look-back direction by the scene boundary and the maximum look-back buffer size and in the look-ahead direction by the scene boundary and the maximum look-ahead delay.

A central tendency sliding window will also be utilized and will also index when the current frame indexes. The basic setting for this statistical sliding window is to have j-L look-back frames extending to the current frame j. With respect to the look-back frames, if there are frames in previous scenes, e.g. not in the current scene, those frames will be excluded. The central tendency sliding window is also bounded in the look-back direction by the scene boundary and the maximum look-back buffer size.

FIGS. 3A and 3B depict the statistical sliding windows 314 and the central tendency sliding window 316. Both windows slide with respect to a current frame j 320. The maximum look-back buffer size 310 extends L look-back frames to the past and the maximum look-ahead delay 326 extends A look-ahead frames to the future. Statistical sliding window 314 is used for the luma transfer function, noise detector and computation of EDR upper bounds and weights. Frames which are statistically similar, e.g. having statistical differences within a predetermined threshold of the current frame are considered to be within a current scene of the current frame and are included. Those frames which have statistics which are dissimilar to the current frame, e.g. having statistical differences greater than a predetermined threshold are excluded. The scene starts at 318, the current frame is 320, the incoming frame is 322 and the scene end is 324.

Generally, the statistical sliding window 314 is bounded in the look-back direction by the maximum look-back buffer size 310 and the scene start 318 and is bounded in the look-ahead direction by the scene end 324 and the maximum look-ahead delay 326.

Generally, the central tendency sliding window 316 is bounded in the look-back direction by the maximum look-back buffer size 310 and the scene start 318 and in the look-ahead direction by the current frame 320.

FIG. 3A depicts an example in which the maximum look-back buffer size 310 allows the buffer to begin in a previous scene in the look-back direction. In this example, the central tendency sliding window 316 and the statistical sliding window 314 are bounded in the look-back direction by the scene start 318. The central tendency sliding window 316 is bounded in the look-ahead direction by the current frame 320. The statistical sliding window 314 is bounded in the look-ahead direction by the maximum look-ahead delay 326.

FIG. 3B depicts an example in which the scene start 318 extends beyond the maximum look-back buffer size 310 in the look-back direction, so in this example the central tendency sliding window 316 and the statistical sliding window 314 are bound in the look-back direction by the maximum look-back buffer size 310. In this example the central tendency sliding window will be bounded in the look-ahead direction by the current frame 320. The statistical sliding window 314 will be bound in the look-ahead direction by the scene end 324.

The solution for the luma reshaping is utilized for a chroma reshaping. The chroma reshaping is derived in part based on the derived luma reshaping function and the original extended dynamic range (EDR) data. To provide temporal stability, components are handled via two level processing, frame statistics level and central tendency sliding window level.

With respect to backward reshaping, the luma backward reshaping function is derived based on the inverse of the luma forward reshaping function. A set of chroma multivariate multi-regression (MMR) components are determined. The operation of the chroma MMR takes three channel input (Y, Cb, Cr) and a reference chroma channel (for example, Cb), then performs optimization to find a set of chroma MMR coefficients which minimize the difference between the predicted chroma (generated by MMR prediction) and the reference chroma. The forward reshaped SDR luma, the reshaped SDR chroma and the chroma MMR components are utilized to determine the backward reshaped EDR chroma.

Luma Reshaping

Figure 4:
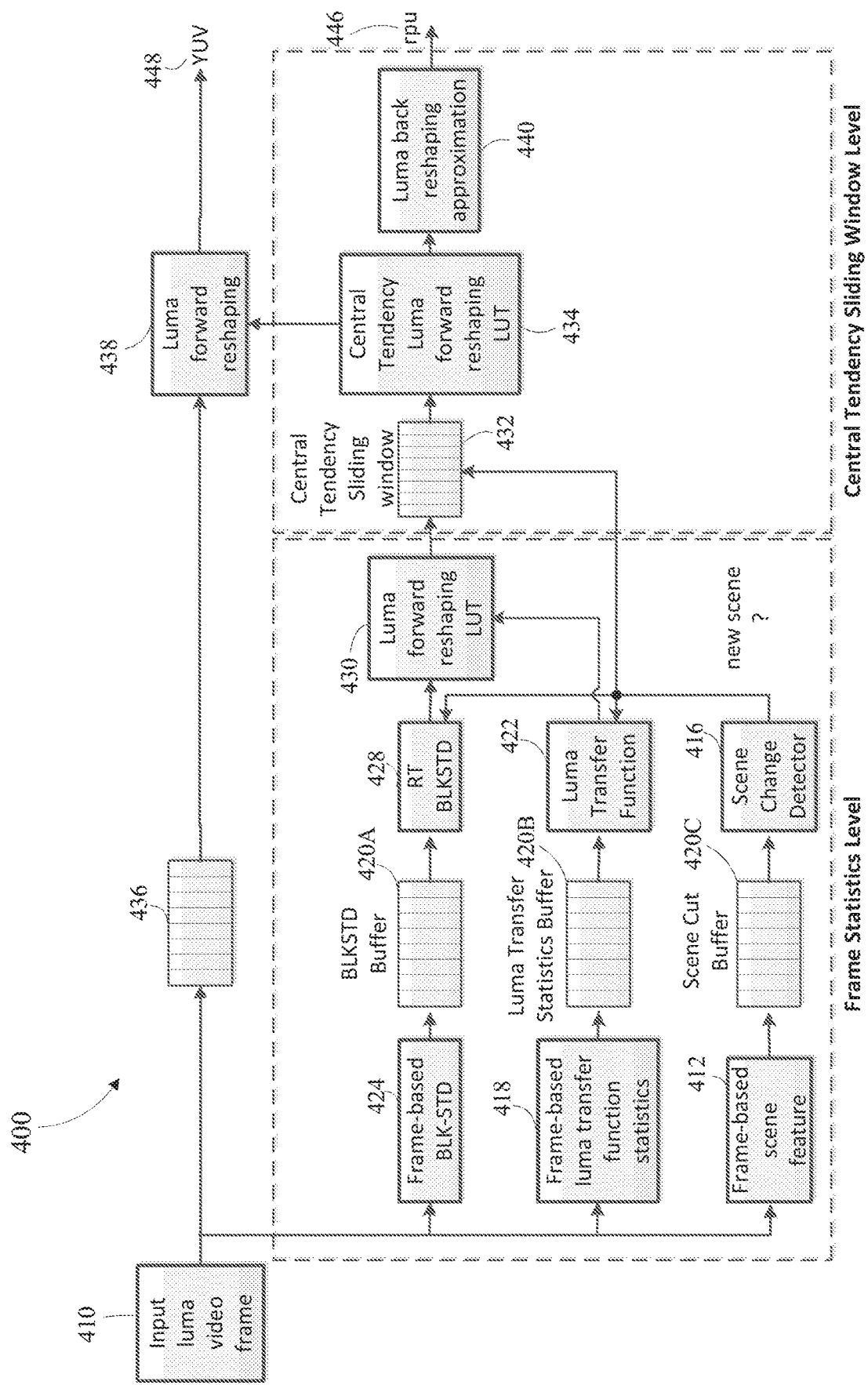
FIG. 4 depicts an example of statistical sliding window and central tendency sliding windows in accordance with an embodiment of the disclosure.

FIG. 4 depicts an example architecture an embodiment of which may be based on in a frame statistics level and a central tendency sliding window level. The frame statistics level has a statistical sliding window (look back+current frame+look ahead) with reset at scene boundaries. The central tendency sliding window level has a central tendency sliding window (look back+current frame). The embodiment may comprise several modules and buffers to store data for the sliding window implementations. In some implementations, the statistical sliding window may only include the current frame and at least one look-back frame, with reset at scene boundaries.

An input luma of a video frame 410 is received and stored in memory 436 to be utilized later in the process.

Within the frame statistics level, a frame-based scene feature module 412, receives input luma, determines frame statistics with respect to scene features and stores that portion of the statistics in a scene cut buffer 420C. A scene cut detection module, performed by a scene cut detector module, 416 reviews the frame statistics between the current frame and the look-back frame and if the statistics are similar includes the look-back frame in the current scene; if the statistics are dissimilar, the look-back frame is excluded from the current scene. The scene cut detector module 416 also reviews the frame statistics between the current frame and the look-ahead frame and if the statistics are similar, includes the look-ahead frame in the current scene and if the statistics are dissimilar the look-ahead frame is excluded from the current scene.

Within the frame statistics level, a frame based luma transfer statistics module, performed by a statistical assessor, 418 receives input luma of a video frame, and determines statistics associated with luma transfer functions. The statistics associated with the luma transfer functions are stored in the luma transfer statistics buffer 420B. The luma transfer function mapper 422 receives the data from the luma transfer statistics buffer 420B that is within the statistical sliding window and utilizes the data from those frames which are included in the current scene and excludes the data from those frames that are not within the current scene as determined by the scene change detector 416 to determine a luma transfer function. The luma transfer function may comprise dynamic tone mapping (DTM), color volume transformations, mapping of perceptual quantization signals to gamma and the like. The user preference adjustment parameters for luma, such as lift, gain and gamma (LGG) or slope, offset and power (SOP), may also be taken in this module to modify the luma transfer function. The statistical sliding window is bounded in the look-back direction by the scene boundary and the maximum look-back buffer size and is bounded in the look-ahead direction by the scene boundary and the maximum look-ahead delay.

Within the frame statistics level, a frame-based block-based standard deviation module 424 receives input luma of the video frame and determines a frame-based block-based standard deviation (BLK-STD) 424, which measures noise. The BLKSTD buffer 420A is used to store the minimal bit depth for luminance ranges. The real-time block based standard deviation (RT BLKSTD) module, performed by a noise detector, 428 receives the data from the BLKSTD buffer 420A which is within the statistical sliding window and utilizes the data from those frames which are included in the current scene and excludes the data from those frames that are not included within the current scene as determined by the scene change detector 416 to determine the RT BLKSTD.

Within the frame statistics level, a luma forward reshaping look-up table (LUT) module is performed by a luma forward reshaper, 430 that is utilized to generate a luma forward reshaping LUT or function based on the luma transfer function from the luma transfer function mapper 422 and the real-time block based standard deviation (RT BLKSTD) from the noise detector 428.

Within the frame statistics level, buffers include a BLK-STD buffer 420A, a luma transfer statistics buffer 420B and a scene cut buffer 420C. The scene change detector 416 determines whether a scene cut is detected from the data collected by it from the scene cut buffer 420C. This scene cut detection will determine in part the location of the statistical sliding window for the luma transfer function module 422 and the RT BLKSTD module 428. The scene detector determines in part the location and size of the statistics sliding window. In the luma transfer function module 422, there are two inputs from the luma transfer statistics buffer 420B and the scene change detector 416. In the RT BLKSTD module 428, input come from the BLKSTD buffer 420A and the scene change detector 416.

The statistical sliding window is determined by the scene cut locations, the maximum look-back buffer size and the maximum look-ahead delay. After determining the location of the statistical sliding window for the luma transfer function module 422, the luma transfer function is determined for the scene. After determining the location of the statistical sliding window for the RT BLKSTD module 428, the BLK-STD is determined for the scene. The luma forward reshaping module 430 receives input from the luma transfer function module 422 and the RT BLKSTD module 428.

Within the central tendency sliding window level, a central tendency sliding window 432 stores the output from the luma forward reshaping look-up table 430.

A central tendency luma forward reshaping look-up table (LUT) module, performed by a central tendency luma forward reshaper, 434 measures a central tendency of the luma forward reshaping functions of the current and the look-back frames utilizing the data from those frames which are included in the current scene and excluding the data from those frames that are not included within the current scene. The central tendency luma forward reshaping look-up table (LUT) module 434 receives data from the central tendency sliding window 432.

The luma forward reshaping module 438 receives the input luma video frames stored in memory 436 and receives the central tendency luma forward reshaping LUT from module 434, yielding the forward look-up table for luma forward reshaping 438.

Within the central tendency sliding window level, a luma backward reshaping module 440 determines the inverse curve of the forward reshaping function to yield the luma backward reshaping approximation that may be output to a reference picture unit (RPU) 446.

Frame Based Luma Forward Reshaping LUT

A frame based statistical sliding window solution utilizes frame statistics from a statistical sliding window. The statistical sliding window indexes when the current frame indexes. The basic setting for this statistical sliding window is to have A look-ahead frames and L look-back frames. If frames within the statistical sliding window are in the current scene of the current frame, they will be included. If frames within the statistical sliding window are not in the current scene of the current frame, they will be excluded. This process of inclusion and exclusion applies to both look-back and look-ahead frames. In other words, in this statistical sliding window approach the frames are considered as being in the current scene if they are within the same scene as the current frame inside the current statistical sliding window.

The frame based statistical sliding window solution will provide a luma forward reshaping LUT, and utilizing the luma forward reshaping LUT solution a central tendency sliding window solution will be found.

Real-Time Block-Based Standard Deviation

As used herein the term block based standard deviation (BLKSTD) is defined in U.S. Provisional Patent Application No. 62/334,099 filed on May 10, 2016, entitled "Block-Based Content-Adaptive Reshaping for High Dynamic Range Images," published also as U.S. Patent Application Publication US 2017/0221189, the disclosure of which is incorporated herein by reference in its entirety.

Denote the $p^{th}$ pixel of the $j^{th}$ input image as $I_j(p)$ with normalized value [0,1] (or alternatively, [0,1)). The minimal, maximal, and average value in this frame are denoted as $v_{L,j}$, $v_{H,j}$, and $v_{M,j}$.

$$v_{L,j}=\min\{I_j(p)\} \quad (1)$$

$$v_{H,j}=\max\{I_j(p)\} \quad (2)$$

$$v_{M,j}=\mathrm{mean}\{I_j(p)\}. \quad (3)$$

The input image $I_j(p)$ is divided into a number of non-overlapping blocks, of size u×u. Denote the set of pixels within the $k^{th}$ block as $\theta_{j,k}$. The mean value of the pixels in the $k^{th}$ block is given as:

$$\mu_{j,k} = \frac{1}{u^2} \sum_{p \in \theta_{j,k}} I_j(p). \quad (4)$$

Then the block-based standard deviation $std_{j,k}$ for the $k^{th}$ block of size u×u is determined;

$$std_{j,k} = \sqrt{\left(\frac{1}{u^2}\sum_{p \in \theta_{j,k}} I_j(p)^2\right) - \mu_{j,k}^2}. \quad (5)$$

$std_{j,k}$ may be considered as the associated standard deviation for the pixels inside the $k^{th}$ block of the $j^{th}$ frame. That is, pixels inside the $k^{th}$ block of the $j^{th}$ frame have associated standard deviation $std_{j,k}$. At this stage, the standard deviation map $H_j(p)$ for pixels of frame j may be determined. For pixel p in frame j, $H_j(p)$ would yield the value of the associated standard deviation of that pixel. To construct the lower bound (bit depth lower bound), some pixels in $H_j(p)$ may be discounted. The following pixels may not be included:

The parts corresponding to the letterbox may not be considered, since those pixels have constant $I_j(p)$ (e.g., all those pixels relate to black pixels). Constant portions will have zero standard deviation and high bit depth. Using those pixels to determine the bit depth lower bound would bias the final bit depth.

The pixels at the right and bottom end of the frame where their corresponding block has size smaller than 16×16 may be excluded.

Denote the pixel index set of valid pixels as $\Omega_j$. Let i be an index inside $\Omega_j$. Therefore, the set of valid standard deviation measurements is denoted as;

$$H_j(i), i \in \Omega_j. \quad (6)$$

For frame j, the noise measurement for the $m^{th}$ bin may be denoted as $b_{j,m}$, and may be obtained by the following procedure.

In a first stage, the input image pixel intensities may be partitioned into M bins with equal interval W (e.g., W=65536/M) to cover the whole dynamic range. Then, the average standard deviation in bins may be found as follows.

For the $m^{th}$ bin (where m=0, 1, ..., M−1), pixels in the original image of frame j, are identified $I_j(i)$, $i \in \Omega_j$, which have the pixel values in the range $$\left[\frac{m}{M}, \frac{m+1}{M}\right].$$

For individual bins, the average standard deviation, $b_{j,m}$, for the pixels inside the bin is found. Denote this average value as $b_{j,m}$, yielding:

$$\Psi_{j,m} = \left\{ i \,\Big|\, \frac{m}{M} \le I_j(i) < \frac{m+1}{M} \right\} \quad (7)$$

$$b_{j,m} = \mathrm{mean}\{H_j(i) \mid i \in \Psi_{j,m}\} \quad (8)$$

Thus, M bins of data as $\{b_{j,m}\}$ may be found.

The luma forward reshaping LUT may be constructed in a similar fashion as has just been described for the BLK-STD with the parameters obtained within the statistical sliding window.

The minimal noise level of frame j−L (look-back frames) to frame j+A (look-ahead frames) for luminance bins m are determined, based on the L+A+1 frames' statistics. If the frames at the beginning of the scene do not have complete L frames then available frames within the scene will be utilized. The starting frame index of this statistical sliding window as K=max(j−L, $F_S$) where $F_S$ is the frame number of the start of scene (e.g., $F_S$=0), and the look-ahead frame index is denoted as $\tilde{j}=\min\{j+A, F_E\}$ where $F_E$ is the frame number of the end of the scene. In other words, K and $\tilde{j}$ are controlled by the scene cut boundary. The average noise measurement over the sliding window (noise parameter for the sliding window) is:

$$b_m^{(j)} = \frac{1}{\tilde{j} - K + 1} \sum_{f=K}^{\tilde{j}} b_{f,m}. \quad (9)$$

The minimum level of the minimal values, average of the average values (mean level), and maximum level of maximal values within the statistical sliding window are derived:

$$v_L^{(j)} = \min\{v_{L,f} | f=K, \ldots, \tilde{j}\} \quad (10)$$

where $v_{L,f}$ is the minimum value for a frame f, and $v_L^{(j)}$ is the minimum of the minimum values, $$v_H^{(j)} = \max\{v_{H,f} | f=K, \ldots, \tilde{j}\} \quad (11)$$

where $v_{H,f}$ is the maximum value for a frame f, and $v_H^{(j)}$ is the maximum of the maximum values, $$v_M^{(j)} = \frac{1}{j-K+1}\sum_{f=K}^{j} v_{M,f} \quad (12)$$

where $v_{M,f}$ is the mean value for a frame f, and $v_M^{(j)}$ is the mean of the mean values.

Bit Depth Lower Bound within Sliding Window

The noise level (noise parameter) $b_m^{(j)}$ can then be converted to a required bit depth $Q_m^{(j)}$ for the current frame, for example via $$Q_m^{(j)} = f(b_m^{(j)})$$

where $f(\cdot)$ may be an empirical function.

The required bit depth $Q_m^{(j)}$ may be normalized by the EDR and SDR bit depths $B_I$ and $B_T$ to obtain a normalized amount of required codewords $D_m^{(j)}$, for example via $$D_m^{(j)} = \left(\frac{2^{Q_m^{(j)}}}{2^{B_T}}\right) / 2^{B_I}$$

After obtaining the normalized amount of required codewords for each bin, this can be extended from the M bins to all codewords in the EDR domain, for example via $$d_i^{(j)} = D_m^{(j)} \text{ for } (m-1)W \leq i < mW$$

That is, for each codeword (pixel value) i in the EDR domain, the normalized amount of required codewords (in the SDR domain) can be given by the normalized amount of required codewords for the bin containing that codeword in the EDR domain. $\{d_i^{(j)}\}$ is the lower bound on the number of required codewords. Any transfer curve (quantization curve) should satisfy this lower bound to avoid generating contouring artifacts.

A luma transfer function may be constructed for M bins using dynamic tone mapping (DTM) curve DTM ($v_H^{(j)}$, $v_M^{(j)}$, $v_L^{(j)}$, $I_j(p)$, $S_j$, $O_j$, $P_j$) with user (shader) preference input slope $S_j$, offset $O_j$ and power $P_j$. In general, the luma transfer function may depend on the minimum level of the minimal values, the mean level of the average values, and the maximum level of the maximal values. The luma transfer function, may also be converted through PQ to gamma function (ETF). For frame j, the luma transfer function may be based on:

$$T^{(j)}(I_j(p)) = ETF(DTM(v_H^{(j)}, v_M^{(j)}, v_L^{(j)}, I_j(p), S_j, O_j, P_j)). \quad (13)$$

In order to be backward compatible in the SDR domain, the mapped range may be constrained to the SMPTE range. Let $T_{min}^{(j)}$ and $T_{max}^{(j)}$ be the minimum and maximum values respectively, i.e., $$T_{min}^{(j)} = T^{(j)}(v_L^{(j)}), \quad (14)$$

and $$T_{max}^{(j)} = T^{(j)}(v_H^{(j)}). \quad (15)$$

If a frame is pure black, the minimum and maximum values in the LUT may be the same. The values in the LUT may be directly clipped to SMPTE range $$\left[\frac{16}{256}, \frac{235}{256}\right]$$

$$T^{(j)} = clip3\left(T^{(j)}, \frac{16}{256}, \frac{235}{256}\right) \text{ where} \quad (16)$$

$$clip3(x, L, H) = \min(\max(x, L), H)$$

If $T_{min}^{(j)}$ is different from $T_{max}^{(j)}$, the luma forward reshaping LUT range $[T_{min}^{(j)}, T_{max}^{(j)}]$ may be linearly scaled to the SMPTE range $[s_{SMPTE,min}^{(j)}, s_{SMPTE,max}^{(j)}]$, where $$s_{SMPTE,min}^{(j)} = \frac{16}{256} \quad (17)$$

and $$s_{SMPTE,max}^{(j)} = \min\left\{\frac{235}{256}, T_{max}^{(j)}\right\}. \quad (18)$$

The constants in equation (18) are defined by the SMPTE standard. The linear scaling is applied to elements in the luma forward reshaping LUT:

$$T^{(j)} = \frac{s_{SMPTE,max}^{(j)} - s_{SMPTE,min}^{(j)}}{T_{max}^{(j)} - T_{min}^{(j)}}\left(T^{(j)} - T_{min}^{(j)}\right) + s_{SMPTE,min}^{(j)}. \quad (19)$$

Output $T^{(j)}$ values are clipped to SMPTE range, $$\left[\frac{16}{256}, \frac{235}{256}\right].$$

Determining a Targeted Mapping Range

Based on $v_L^{(j)}$ and $v_H^{(j)}$, the extreme values may be found after finding the luma transfer function:

$$S_L^{(j)} = T^{(j)}(v_L^{(j)})$$

$$S_H^{(j)} = T^{(j)}(v_H^{(j)}). \quad (20)$$

Define the normalized available luma transfer function codeword range as:

$$R^{(j)} = \frac{s_H^{(j)} - s_L^{(j)}}{2^{B_T}}, \quad (21)$$

where $B_T$ is the SDR bit depth. This is the codeword budget that may be used in the forward reshaping process.

Targeted Bit Depth per Bin

The differential value between $T^{(j)}(i)$ and $T^{(j)}(i-1)$ is found as the bit depth in input codeword.

$$t_i^{(j)} = T^{(j)}(i) - T^{(j)}(i-1) \text{ set } t_0^{(j)} = 0; \quad (22)$$

$$\sum_{i=v_L^{(j)}}^{v_H^{(j)}} t_i^{(j)} \leq R^{(j)} \leq 1 \quad (23)$$

Select Largest Value Per Bin

For individual input codewords, there are two different bit depths: (1) $d_i^{(j)}$ from noise measurement; and (2) $t_i^{(j)}$ from the luma transfer function. Two sets are constructed depending on which value is larger:

$$\Omega^{(j)} = \{i | t_i^{(j)} > d_i^{(j)}\}$$

$$\Phi^{(j)} = \{i | t_i^{(j)} \le d_i^{(j)}\} \quad (24)$$

For input codeword i, if the luma transfer function bit depth $t_i^{(j)}$ is no larger than the $d_i^{(j)}$, (i.e. $i \in \Phi^{(j)}$) it implies there is a chance to observe banding artifact, which is not sought. Therefore, $d_i^{(j)}$ is used in this input codeword:

$$\tilde{d}_i^{(j)} = d_i^{(j)} \text{ for } i \in \Phi^{(j)}. \quad (25)$$

Determine Extra Allocated Codeword

The extra allocated codewords may be determined as:

$$E^{(j)} = \sum_{i \in \Phi^{(j)}} (d_i^{(j)} - t_i^{(j)}). \quad (26)$$

Deduction of Extra Allocated Codeword

These extra codewords are to be deducted from set $\Omega^{(j)}$. A simple way is to equally reduce a fixed number of codewords $$\frac{E^{(j)}}{|\Omega^{(j)}|}:$$

$$\tilde{d}_i^{(j)} = t_i^{(j)} - \frac{E^{(j)}}{|\Omega^{(j)}|} \text{ for } i \in \Omega^{(j)}. \quad (27)$$

Note that it is possible that $\tilde{d}_i^{(j)} < d_i^{(j)}$ after this deduction. This situation is to be avoided, by determining extra allocated codewords also for these pixels.

Smooth the Curve

A simple moving average filter may be used covering two bin widths, namely, 2 W. One example is shown below:

$$\tilde{s}_i^{(j)} = \sum_{k=-W}^{W} a_k \cdot \tilde{d}_{i+k}^{(j)} \text{ where} \quad (28)$$

$$a_k = \frac{1}{2W+1}$$

Construct Frame-Level Forward Reshaping LUT

Let $c_L$, $c_H$ denote the minimum and maximum luminance values in the SDR domain. A forward reshaping LUT may be built based on the smoothed curve via cumulative summation with the offset from the targeted lower luminance in the SDR domain, i.e. $c_L$. Denote this LUT at frame j as $FLUT_j$. This $FLUT_j$ is monotonically non-decreasing.

Central Tendency Level Luma Reshaping LUT

If the frame statistics level LUT, ($FLUT_j$), is applied to reshape EDR frames, flickering issues may result in the temporal domain. The maximum level of the maximal EDR value and minimum level of the minimal EDR value in the statistical sliding window, $v_L^{(j)}$ and $v_H^{(j)}$ may be different from $v_L^{(j+1)}$ and $v_H^{(j+1)}$, which yields different frame statistics level LUT for frame j and frame j+1, resulting in a potential flickering issue.

One solution is to take average of the maximal and minimal EDR values in the statistical sliding window:

$$\hat{v}_L^{(j)} = \frac{1}{\tilde{j} - K + 1} \sum_{f=K}^{\tilde{j}} v_{L,f} \quad (29)$$

$$\hat{v}_H^{(j)} = \frac{1}{\tilde{j} - K + 1} \sum_{f=K}^{\tilde{j}} v_{H,f} \quad (30)$$

Then plug them in the luma transfer function, e.g. DTM algorithm. This approach results in information clipped which impacts on the reversibility. It is quite possible that $\hat{v}_L^{(j)}$ is greater than $v_{L,j}$, and/or $\hat{v}_H^{(j)}$ is less than $v_{H,j}$, and then the $FLUT_j$ will clip the information of $v_{L,j}$ and $v_{H,j}$ out. The information cannot be recovered in the backward reshaping.

In order to preserve information, we stick to the min, max and average values in the statistical sliding window as defined in (10)-(12):

$$v_L^{(j)} = \min\{v_{L,f} | f = K, \ldots, \tilde{j}\} \quad (31)$$

$$v_H^{(j)} = \max\{v_{H,f} | f = K, \ldots, \tilde{j}\}$$

$$v_M^{(j)} = \frac{1}{\tilde{j} - K + 1} \sum_{f=K}^{\tilde{j}} v_{M,f}$$

In order to reduce flickering, averaging is applied to the $FLUT_j$ of the current and the look-back frames:

$$FLUT^{(j)}(v) = \frac{1}{j - K + 1} \sum_{f=k}^{j} FLUT_f(v) \text{ for all } v. \quad (32)$$

$FLUT_f(v)$ is the frame statistics level LUT of frame f, and $FLUT^{(j)}(v)$ is the central tendency luma forward reshaping function. In order to reduce delays, look-ahead frames are not utilized for reshaping averaging.

The reshaped signal may be generated via the FLUT:

$$\hat{s}_{i,j}^y = FLUT^{(j)}(v_{ji}^y) \quad (33)$$

where $v_{ji}^y$ is the original EDR luma of pixel i in frame j, and $\hat{s}_{ji}^y$ is the forward reshaped SDR luma.

Luma Modulated Chroma Forward Reshaping in a First System

Figure 5:
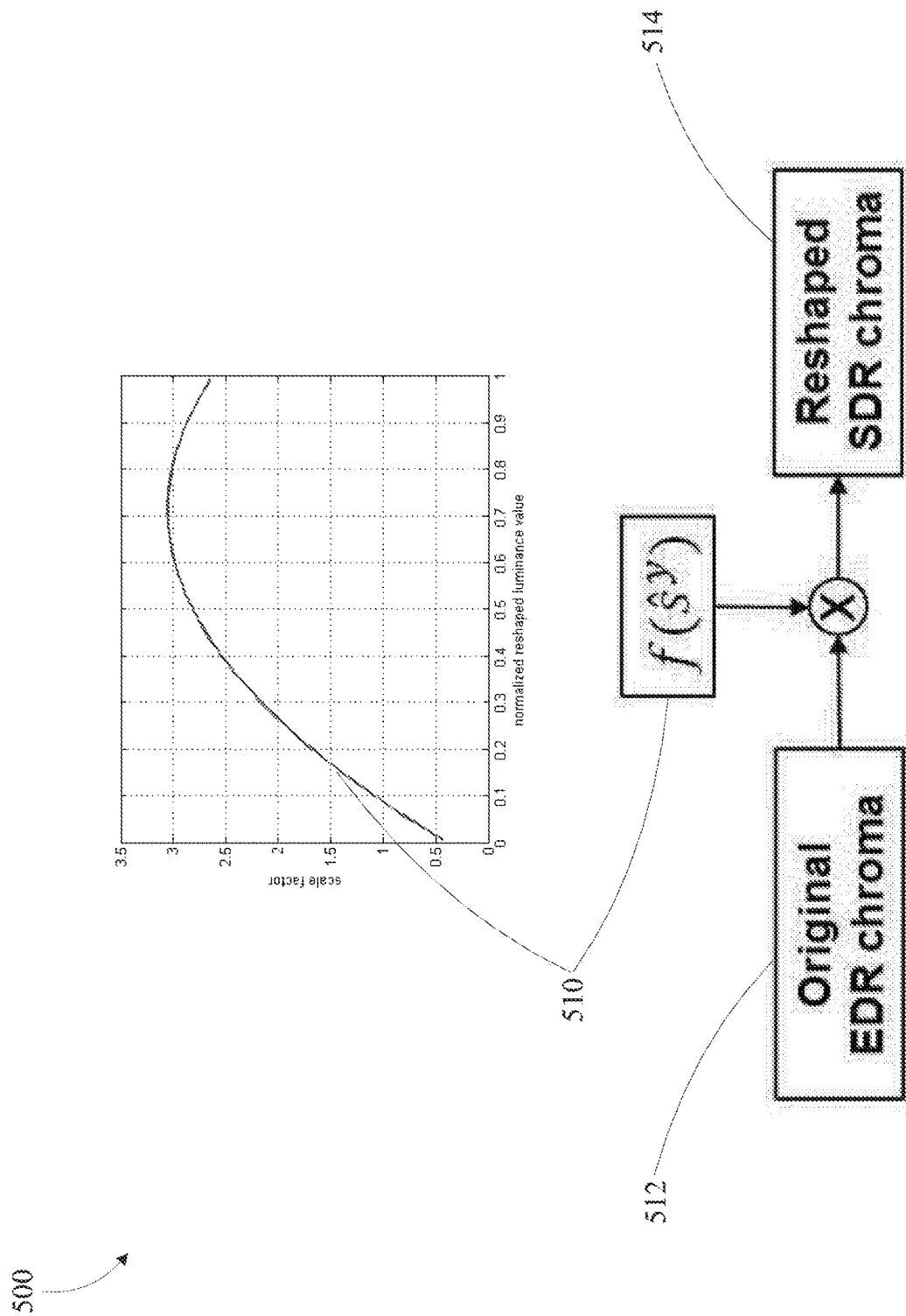
FIG. 5 depicts an example chroma reshaping in accordance with an embodiment of the disclosure.

FIG. 5 depicts an overview of chroma reshaping 500. In the first example the luma modulated reshaping function 510 in conjunction with the original extended dynamic range (EDR) data 512 is used to determine a reshaped standard dynamic range (SDR) output 514.

Figure 6:
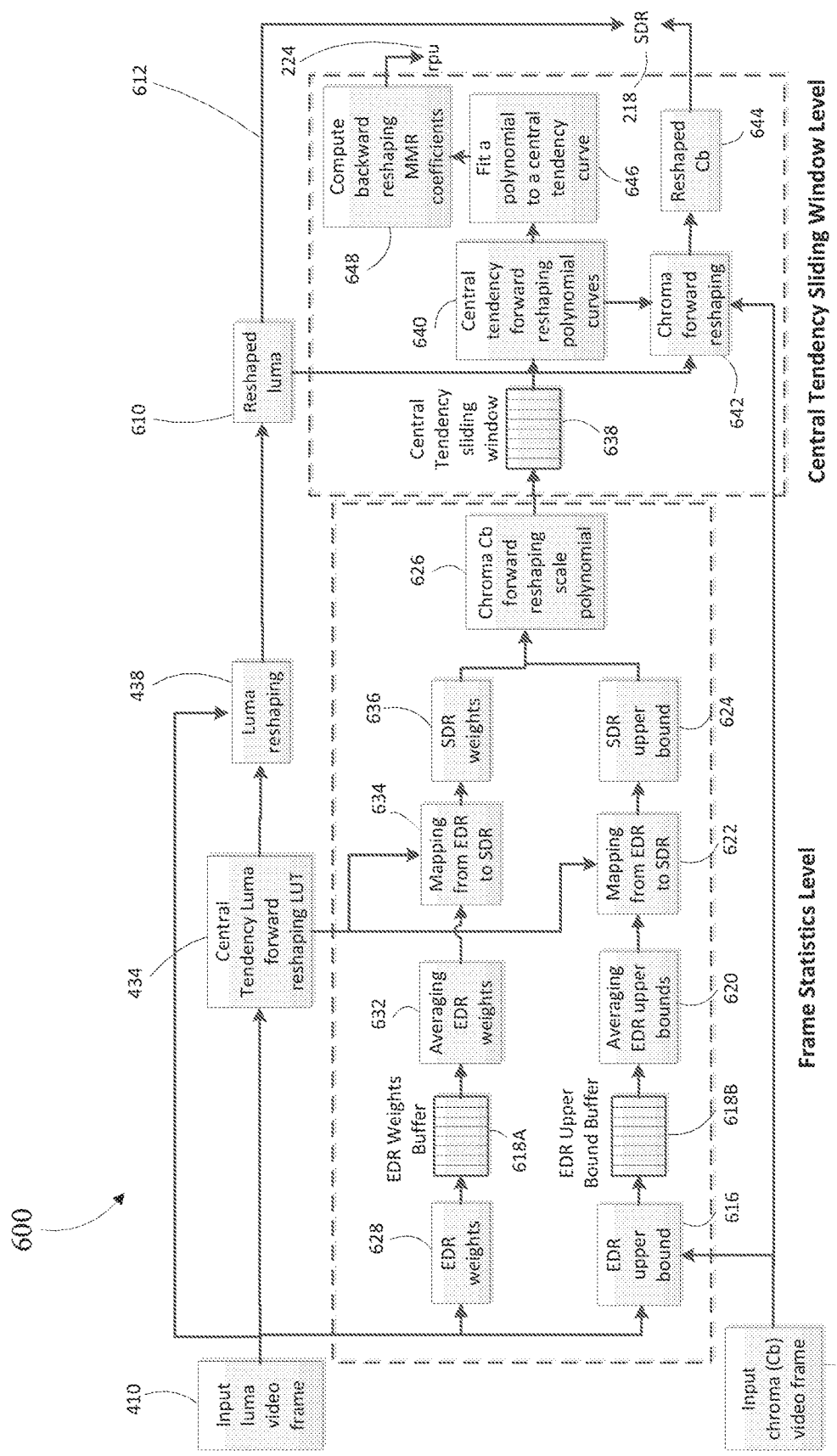
FIG. 6 depicts a first example chroma reshaping system in accordance with an embodiment of the disclosure.

FIG. 6 depicts a first example of chroma forward reshaping 600 for Cb channel. Cr channel can be performed in a similar way. In this example an input luma video frame 410 is input, a central tendency luma forward reshaping LUT 434 is determined as indicated previously and the luma undergoes reshaping 438 to yield a reshaped luma 610.

At the frame statistics level, an input chroma video frame 614 is input. Two tracks will be followed, determining an EDR upper bound 616 and EDR weights 628, performed by the extended dynamic range analyzer, performing analysis of the current frame, the at least one look-ahead frame (if any) and the at least one look-back frame (if any) within the statistical sliding window.

In the EDR upper bound track, the EDR upper bounds are determined 616 and collected in an EDR upper bound buffer 618B and the upper bounds are averaged 620; note that central tendency characteristics other than averaging may be utilized. Utilizing the central tendency luma forward reshaping LUT 434 and the averaged EDR upper bounds, a mapping is performed from EDR to SDR 622 and SDR upper bounds are determined 624.

In the EDR weights track, the EDR weights are determined 628 and stored in the EDR weights buffer 618A, the EDR weights are averaged 632, e.g. a central tendency is found, and utilizing the central tendency luma forward reshaping LUT and the averaged EDR weights, a mapping is performed from EDR to SDR 634 and the SDR weights are determined 636. The EDR to SDR mapping function of 622 and 634 are performed by the bridge mapper. The averaging of the EDR weights 632 is just one example of any number of central tendency measures that may be found.

The SDR weights 636 and the SDR upper bounds 624 are utilized to determine a chroma forward reshaping scale polynomial 626, performed by the chroma frame solver.

At the central tendency sliding window level, the chroma forward reshaping polynomial 626 is input from the frame statistics level into a central tendency sliding window 638 in which the central tendency of the forward reshaping polynomial curves 640 is found, termed the chroma polynomial linear non-linear combiner. The central tendency forward reshaping polynomial curves are fit to a central tendency curve 646 from which chroma MMR coefficients are determined, performed by the chroma MMR determiner, 648 and output to a reference picture unit (rpu) 224.

The central tendency (e.g. linear/non-linear combined) forward reshaping polynomial curves 640 along with the reshaped luma 610 and the input chroma video frame 614 are utilized to determine chroma forward shaping, termed the chroma reshaper, 642 resulting in a reshaped chroma 644 which along with the reshaped luma 612 results in an SDR data output 218.

Figure 7:
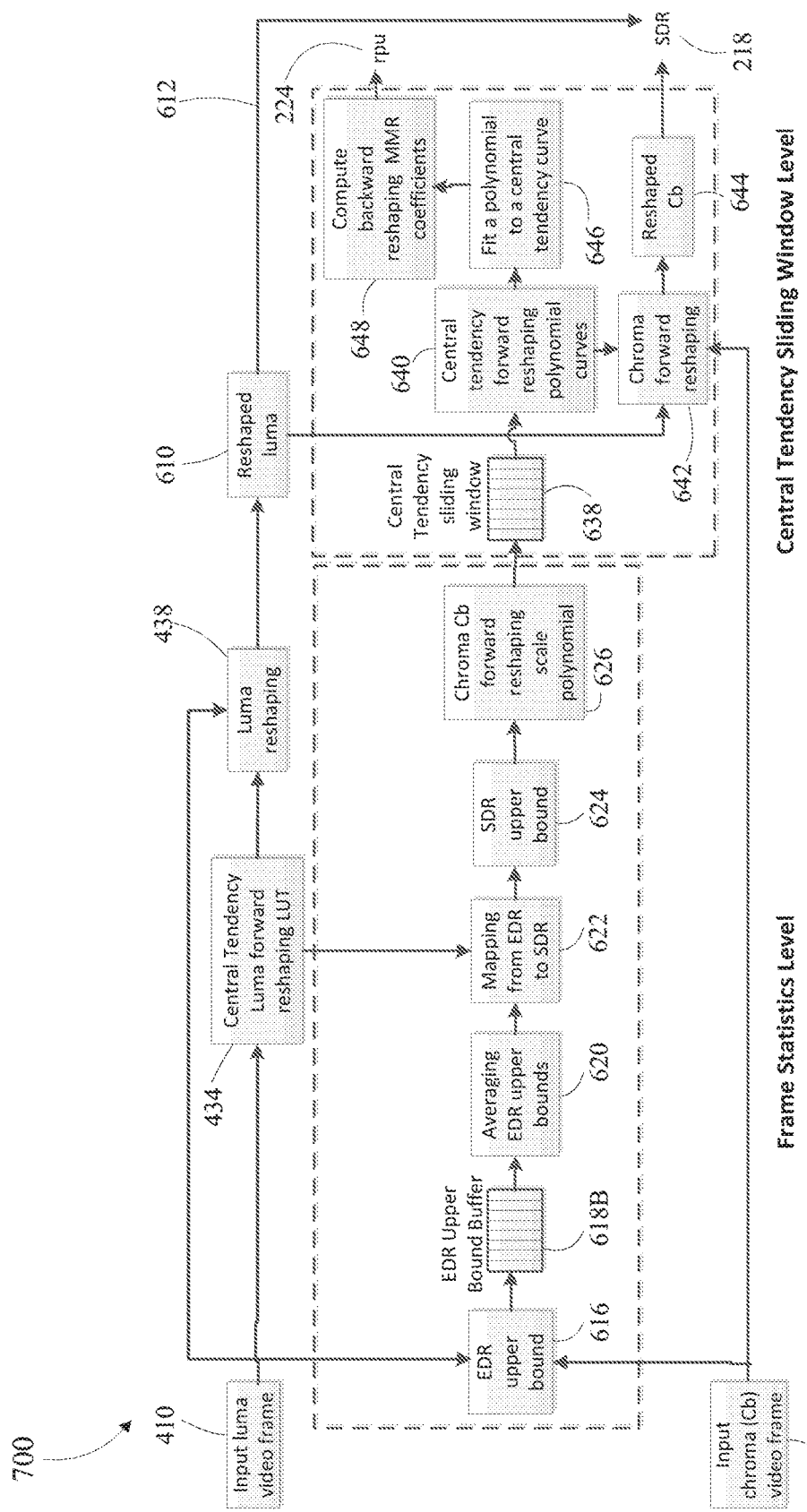
FIG. 7 depicts a second example chroma reshaping system in accordance with an embodiment of the disclosure.

FIG. 7 depicts a second example of chroma forward reshaping 700 for Cb channel. Cr channel can be performed in a similar way. FIG. 7 is a modified version of the method of FIG. 6 in which only the EDR upper bound is statistically analyzed. In this example an input luma video frame 410 is input, a central tendency luma forward reshaping LUT 434 is determined as indicated previously and the luma undergoes reshaping 438 to yield a reshaped luma 610.

At the frame statistics level, an input chroma video frame 614 is input. In this example only the EDR upper bound 616 is statistically analyzed by the extended dynamic range analyzer, performing analysis of the current frame, the at least one look-ahead frame (if any) and the at least one look-back frame (if any) within the statistical sliding window.

The EDR upper bounds are determined 616 and collected in an EDR upper bound buffer 618B and the upper bounds are averaged 620; note that central tendency characteristics other than averaging may be utilized. Utilizing the central tendency luma forward reshaping LUT 434 and the averaged EDR upper bounds, a mapping is performed from EDR to SDR 622 and SDR upper bounds are determined 624. The SDR upper bounds 624 are utilized to determine a chroma forward reshaping scale polynomial 626, performed by the chroma frame solver.

At the central tendency sliding window level, the chroma forward reshaping polynomial 626 is input from the frame statistics level into a central tendency sliding window 638 in which the central tendency of the forward reshaping polynomial curves 640 is found, termed the chroma polynomial linear non-linear combiner. The central tendency forward reshaping polynomial curves are fit to a central tendency curve 646 from which chroma MMR coefficients are determined, performed by the chroma MMR determiner, 648 and output to a reference picture unit (rpu) 224.

The central tendency (e.g. linear/non-linear combined) forward reshaping polynomial curves 640 along with the reshaped luma 610 and the input chroma video frame 614 are utilized to determine chroma forward shaping, termed the chroma reshaper, 642 resulting in a reshaped chroma 644 which along with the reshaped luma 612 results in an SDR data output 218.

The forward reshaped SDR chroma (channel Cb) of pixel i in frame j is $\hat{s}_{ji}^u$ and the original EDR chroma (channel Cb) of pixel i in frame j is $v_{ji}^u$. A luminance modulated chroma forward reshaping may be performed based on the reshaped SDR luma s:

$$\hat{s}_{ji}^u = \tilde{f}_j(\hat{s}_{ji}^y) \cdot (v_{ji}^u - 0.5) + 0.5. \tag{34}$$

where $\hat{S}_{ji}^u$ is the forward reshaped SDR chroma (channel Cb) of pixel i in frame j, and $v_{ji}^u$ is the original EDR chroma (channel Cb) of pixel i in frame j. In the following, channel Cb may be used as an example to explain chroma forward and backward reshaping. Channel Cr may be processed in the same way.

The luma modulated scale function of frame j, $\tilde{f}_j(\hat{s}_{ji}^y)$, may take the form of a polynomial function of $\hat{s}_{ji}^y$ with $K^F$ order:

$$\tilde{f}_j(\hat{s}_{ji}^y) = \sum_{k=0}^{K^F} \tilde{\alpha}_{j,k} \cdot (\hat{s}_{ji}^y)^k \tag{35}$$

where $\{\tilde{\alpha}_{j,k}\}$ are the polynomial coefficients and $K^F=2$ ($2^{nd}$-order polynomial). The reference polynomial coefficients $\{\alpha_{r,k}\}$ may also be determined. A reference polynomial may be a luminance dependent chroma scale factor, $2^{nd}$ order polynomial trained from a training dataset.

Content-Adaptive Reversible Reshaping Function

The reshaped SDR may be utilized to derive the maximal scale factor to maintain the EDR reversibility. To determine the reshaped SDR, the luma forward reshaping function may be utilized. The maximal scale factors may be filtered and smoothed along time domain for use in real-time determinations.

Figure 8:
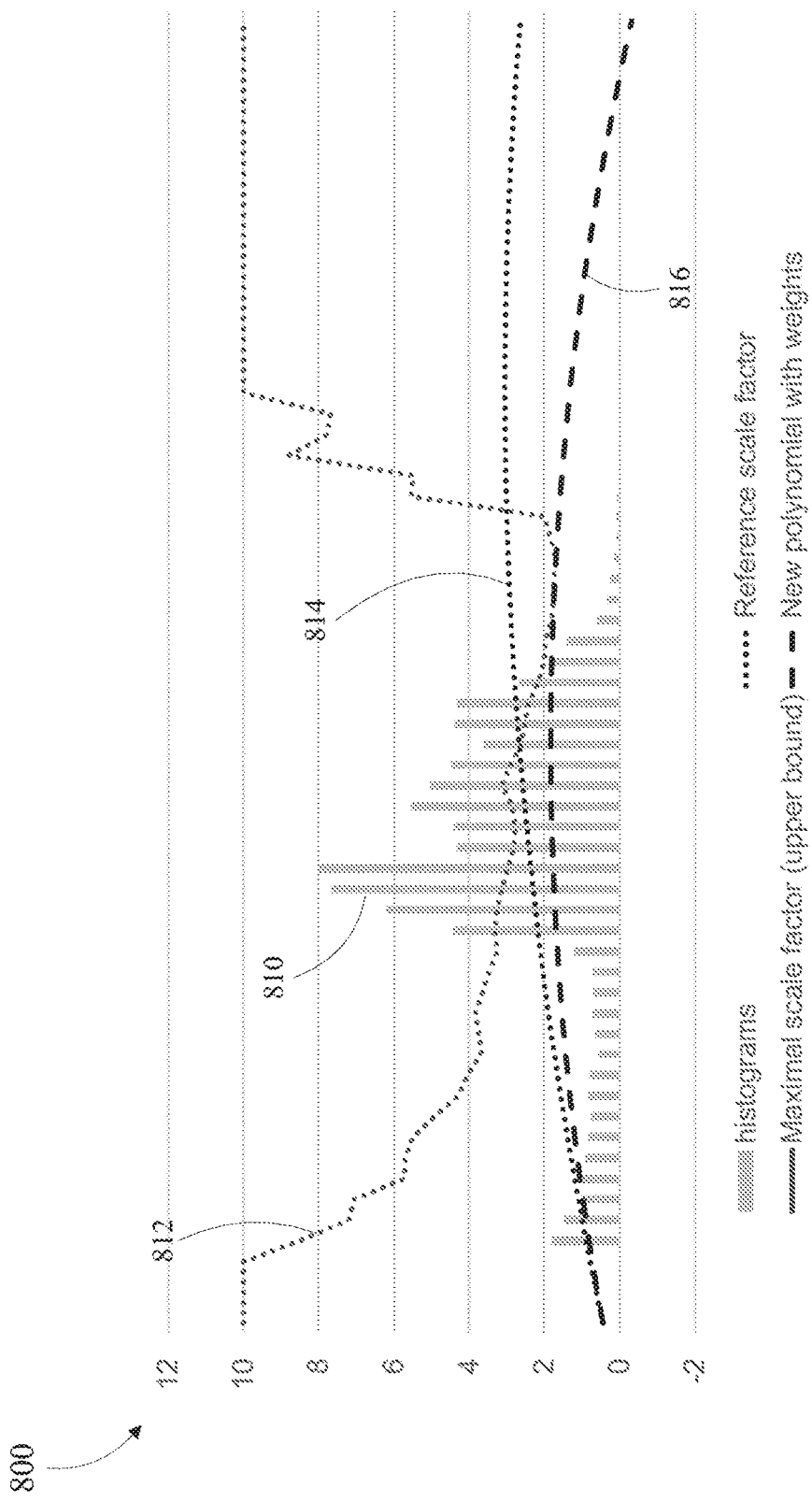
FIG. 8 depicts an example content dependent polynomial in accordance with an embodiment of the disclosure.

FIG. 8 depicts a content dependent polynomial 800. In the event that the chroma overflows or underflows, it may be clipped to the reshaped domain. In this event a maximal scale factor (upper bound) is located for luminance ranges 812. A new polynomial would be determined by minimizing the weighted distance between the reference 814 and new polynomial 816, such that the new polynomial is bounded by zero and the upper bound. The weighting factor would be the number of pixels in bins 810.

Maximal Scale Factor in EDR Domain

The luma may be divided into $M_E$ ranges and the EDR luma histograms collected:

$$\Psi_{j,m} = \left\{ i \,\bigg|\, \frac{m}{M_E} \leq v_{ji}^y < \frac{m+1}{M_E} \right\} \tag{36}$$

where $m = 0, 1, \ldots, M_E - 1$.

where $\Psi_{j,m}$ is the set of pixels having values between $$\left[\frac{m}{M_E}, \frac{m+1}{M_E}\right]$$

and the original EDR chroma of pixel i in frame j is $v_{ji}^u$.

The maximal chroma value in bins may be determined:

$$\hat{c}_{j,m} = \eta \cdot \max(\{|v_{ji}^u - 0.5\| i \in \Psi_{j,m}\}) \quad (37)$$

where the empirical value of $\eta$ is 0.85 for full range output and $\eta$ is 0.95 for SMPTE range output.

The upper bound of chroma scale factor of bins (EDR upper bound) may be determined $\hat{q}_{j,m} = \min\{0.5/\hat{c}_{j,m}, q^{max}\}$ for full range and $\hat{q} = \min\{0.4375/\hat{c}_{j,m}, q^{max}\}$ for SMPTE range, where the empirical value of $q^{max}$ is 10. The EDR upper bound of frames in the statistical sliding window may be collected, and average the EDR upper bounds derived:

$$\hat{q}_m^{(j)} = \frac{1}{j-K+1}\sum_{f=K}^{j}\hat{q}_{f,m} \quad (38)$$

for $m = 0, 1, \ldots, M_E - 1$.

Where $\hat{q}_{f,m}$ is the EDR upper bound for frames within the statistical sliding window.

Maximal Scale Factor in SDR Domain

The EDR upper bound may be mapped to SDR by using the luma FLUT of frame j (current frame). The x-axis from EDR luma may be changed to the reshaped SDR luma. $M_E$ is uniformly sampled in the EDR domain between [0 1]:

$$\hat{x}_m = \frac{2m+1}{2M_E},$$

where $m = 0, 1, \ldots, M_E - 1$. The sampled points $\hat{x}_m$ may be mapped from the EDR domain to the SDR domain which has $M_S$ bins:

$$\tilde{x}_m = \text{FLUT}^{(j)}(\hat{x}_m) \quad (39)$$

Note that $M_E$ is larger than $M_S$, namely, the higher-precision of bins is mapped to lower precision of bins.

Then for $n = 0, 1, \ldots, M_S - 1$, the indexes $\hat{x}_m$ in the $n^{th}$ bin may be:

$$\Phi_n = \left\{m \mid \frac{n}{M_S} \le \tilde{x}_m < \frac{n+1}{M_S}\right\} \text{ for } n = 0, 1, \ldots, M_S - 1. \quad (40)$$

Note that several $\hat{x}_m$ may be in the same bin, and some bins may be empty. The SDR upper bound may be found by taking the minimum of EDR upper bounds:

$$\tilde{q}_n^{(j)} = \min\{\hat{q}_k^{(j)} | k \in \Phi_n\} \text{ for } n=0,1,\ldots,M_S-1. \quad (41)$$

The empty bins in series $\{\tilde{q}_n^{(j)}\}$ may be interpolated according to the neighboring conditions, if the left and right neighbors are available for one empty bin, a bi-linear interpolation may be applied based on the nearest left and right neighbors, if only left or only right neighbor are available for an empty bin, such as at the end of series of $\{\tilde{q}_n^{(j)}\}$, the value of the closest non-empty bin may be copied and $\{\tilde{q}_n^{(j)}\}$ may be the SDR upper bound of frame j.

Frame Statistics Level Generation of Forward Reshaping Polynomial

Similar to luma determination, the chroma reshaping function may be generated in two different levels.

$M_S$ samples may be obtained from the reference polynomial curve:

$$x_n = \frac{2n+1}{2M_S} \quad (42)$$

$$r_n = \tilde{f}_r(x_n) = \sum_{k=0}^{2}\tilde{\alpha}_{r,k}\cdot(x_n)^k \text{ for } n = 0, 1, \ldots, M_S - 1. \quad (43)$$

Three points may be determined;

Point A: $(x_0, r_0)$

Point B: $(x_T, \tilde{q}_T^{(j)})$ where $T = \arg_n \min(\tilde{q}_n^{(j)} - r_n)$ and Point C: $(x_T, \tilde{q}_C^{(j)})$ where $C = \arg_n \min(\tilde{q}_n^{(j)})$. \quad (44)

The frame-based polynomial coefficients may be determined. If Point B is above or on the reference polynomial curve, i.e., $\min(\tilde{q}_n^{(j)} - r_n) \ge 0$, where $\tilde{q}_n^{(j)}$ is the SDR upper bound and the reference polynomial for this frame: $\{\tilde{\alpha}_{j,k}\} = \{\alpha_{r,k}\}$ is utilized.

Otherwise, the forward reshaping $2^{nd}$-order polynomial may be found by solving a distance optimization problem. The polynomial may intersect Point A and Point B, and have the shortest weighted distance from the reference curve. The weights may be determined by the number of pixels in bins. An average weight of frames in the statistical sliding window may be determined and the weights in EDR domain obtained and mapped to the SDR domain.

For frames in the statistical sliding window, the number of pixels in bins in the EDR image may be determined for histogram $\Psi_{j,m}$:

$$\hat{w}_{j,m} = |\Psi_{j,m}| \text{ where } m=0,1,\ldots,M_E-1. \quad (45)$$

where $\Psi_{j,m}$ is defined as (36). The EDR weights may be averaged over the statistical sliding window:

$$\hat{w}_m^{(j)} = \frac{1}{j-K+1}\sum_{f=K}^{j}\hat{w}_{f,m} \text{ for } m = 0, 1, \ldots, M_E - 1. \quad (46)$$

The EDR domain may be mapped to the SDR domain:

$$\Phi_n = \left\{m \mid \frac{n}{M_S} \le \tilde{x}_m < \frac{n+1}{M_S}\right\} \text{ for } n = 0, 1, \ldots, M_S - 1. \quad (47)$$

The EDR weights may be mapped to the SDR domain:

$$w_n^{(j)} = \sum_{k \in \Phi_n}\hat{w}_k^{(j)} \text{ for } n = 0, 1, \ldots, M_S - 1. \quad (48)$$

Empty bins may be interpolated, excluding end bins, if there are empty bins on both ends, they are not interpolated. The empty bins may be interpolated between the non-empty bins and $\{w_n^{(j)}\}$ the weights taken for optimization. After interpolation, the non-empty bins may be derived based on: $\Omega_j = \{n|w_n^{(j)} > 0\}$. This would exclude the empty bins on both ends.

After the weights are obtained, the polynomial coefficients may be optimized by:

$$\tilde{\alpha}_{j,2}^* = \arg\min_{\tilde{\alpha}_{j,2}} \left( \sum_{n=0}^{M_S-1} w_n^{(j)} \cdot |r_n - \tilde{f}_j(x_n)|^2 \right) \text{ where} \quad (49)$$

$$\tilde{f}_j(x_n) = \tilde{\alpha}_{j,0} + \tilde{\alpha}_{j,1} \cdot x_n + \tilde{\alpha}_{j,2} \cdot (x_n)^2$$

$$\tilde{\alpha}_{j,1} = \frac{r_0 - \tilde{q}_T^{(j)}}{x_0 - x_T} - \tilde{\alpha}_{j,2}(x_0 + x_T) \quad (50)$$

$$\tilde{\alpha}_{j,0} = r_0 - x_0 \tilde{\alpha}_{j,1} - x_0^2 \tilde{\alpha}_{j,2} \quad (51)$$

$$\tilde{f}_j(x_n) \leq \tilde{q}_n^{(j)} \text{ for } n \in \Omega_j$$

$$\tilde{f}_j(x_n) > \varepsilon \text{ for all } n, \text{ where } \varepsilon \geq 0. \quad (52)$$

If a search fails, a $1^{st}$-order polynomial may be utilized. The coefficients may be found by solving the optimization problem (the polynomial goes through Point C, and has the shortest weighted distance from the reference curve):

$$\tilde{\alpha}_{j,1}^* = \arg\min_{\tilde{\alpha}_{j,1}} \left( \sum_{n=0}^{M_S-1} w_n^{(j)} \cdot |r_n - \tilde{f}_j(x_n)|^2 \right) \text{ where} \quad (53)$$

$$\tilde{f}_j(x_n) = \tilde{\alpha}_{j,0} + \tilde{\alpha}_{j,1} \cdot x_n$$

$$\tilde{\alpha}_{j,0} = \tilde{q}_C^{(j)} - \tilde{\alpha}_{j,1} \cdot x_C \quad (54)$$

$$\tilde{\alpha}_{j,2} = 0 \quad (55)$$

$$\tilde{f}_j(x_n) \leq \tilde{q}_n^{(j)} \text{ for } n \in \Omega_j \quad (56)$$

$$\tilde{f}_j(x_n) > \varepsilon \text{ for all } n, \text{ where } \varepsilon \geq 0.$$

The new polynomial may also be obtained by the unweighted distance from the reference curve. In this case, we may not collect the EDR weights. The polynomial coefficients may be obtained by:

$$\tilde{\alpha}_{j,2}^* = \arg\min_{\tilde{\alpha}_{j,2}} \left( \sum_{n=0}^{M_S-1} |r_n - \tilde{f}_j(x_n)|^2 \right) \text{ where} \quad (57)$$

$$\tilde{f}_j(x_n) = \tilde{\alpha}_{j,0} + \tilde{\alpha}_{j,1} \cdot x_n + \tilde{\alpha}_{j,2} \cdot (x_n)^2$$

$$\tilde{\alpha}_{j,1} = \frac{r_0 - \tilde{q}_T^{(j)}}{x_0 - x_T} - \tilde{\alpha}_{j,2}(x_0 + x_T) \quad (58)$$

$$\tilde{\alpha}_{j,0} = r_0 - x_0 \tilde{\alpha}_{j,1} - x_0^2 \tilde{\alpha}_{j,2} \quad (59)$$

$$\varepsilon < \tilde{f}_j(x_n) \leq \tilde{q}_n^{(j)} \text{ for all } n, \text{ where } \varepsilon \geq 0. \quad (60)$$

If a search fails, a $1^{st}$-order polynomial may be utilized. The coefficients may be found by solving the optimization problem (the polynomial goes through Point C, and has the shortest unweighted distance from the reference curve):

$$\tilde{\alpha}_{j,1}^* = \arg\min_{\tilde{\alpha}_{j,1}} \left( \sum_{n=0}^{M_S-1} |r_n - \tilde{f}_j(x_n)|^2 \right) \text{ where} \quad (61)$$

$$\tilde{f}_j(x_n) = \tilde{\alpha}_{j,0} + \tilde{\alpha}_{j,1} \cdot x_n$$

$$\tilde{\alpha}_{j,0} = \tilde{q}_C^{(j)} - \tilde{\alpha}_{j,1} \cdot x_C \quad (62)$$

$$\tilde{\alpha}_{j,2} = 0 \quad (63)$$

$$\varepsilon < \tilde{f}_j(x_n) \leq \tilde{q}_n^{(j)} \text{ for all } n, \text{ where } \varepsilon \geq 0. \quad (64)$$

Central Tendency Sliding Window Level Generation of Forward Reshaping Polynomial The polynomial curves of the current and the look-back frames may be averaged and fit a new polynomial to the averaged curve.

If the frame-coefficients of the current and the look-back frames in the central tendency sliding window are the same as the reference coefficients $\{\alpha_{r,k}\}$, then the final coefficients may be $\{\alpha_{r,k}\}$. Otherwise, for current and look-back frames, $M_S$ samples on the polynomial may be obtained:

$$y_{j,n} = \tilde{f}_j(x_n) = \tilde{\alpha}_{j,0} + \tilde{\alpha}_{j,1} \cdot x_n + \tilde{\alpha}_{j,2} \cdot (x_n)^2 \text{ for } n=0,1,\ldots,M_S-1. \quad (65)$$

The samples may be averaged for the polynomial:

$$y_n^{(j)} = \frac{1}{j - K + 1} \sum_{f=K}^{j} y_{f,n}. \quad (66)$$

A 2-order polynomial to $\{y_n^{(j)}\}$ may be fit, having coefficients $\{\tilde{\alpha}_k^{(j)}\}$. The fitting smooths the chroma forward reshaping scale factors.

Note that the determination may be reduced by averaging the coefficients in the central tendency sliding window directly, as long as $\{x_n\}$ are the same for all the frames. $\{y_{j,n}\}$ may be rewritten in the form $y_j = X\tilde{\alpha}_j$, were $$y_j = \begin{bmatrix} y_{j,0} \\ y_{j,1} \\ \vdots \\ y_{j,M_S-1} \end{bmatrix}, X = \begin{bmatrix} 1 & x_0 & (x_0)^2 \\ 1 & x_1 & (x_1)^2 \\ \vdots & \vdots & \vdots \\ 1 & x_{M_S-1} & (x_{M_S-1})^2 \end{bmatrix}, \tilde{\alpha}_j = \begin{bmatrix} \tilde{\alpha}_{j,0} \\ \tilde{\alpha}_{j,1} \\ \tilde{\alpha}_{j,2} \end{bmatrix} \quad (67)$$

$\{y_n^{(j)}\}$ may be rewritten as $$y^{(j)} = \begin{bmatrix} y_0^{(j)} \\ y_1^{(j)} \\ \vdots \\ y_{M_S-1}^{(j)} \end{bmatrix} = \quad (68)$$

$$\frac{1}{j-K+1} \sum_{f=K}^{j} y_f = \frac{1}{j-K+1} \sum_{f=K}^{j} X\tilde{\alpha}_f = X\left(\frac{1}{j-K+1} \sum_{f=K}^{j} \tilde{\alpha}_f\right)$$

A polynomial is fit to $\{y_n^{(j)}\}$ so that $y^{(j)} = X\tilde{\alpha}^{(j)}$, where $$\tilde{\alpha}^{(j)} = \begin{bmatrix} \tilde{\alpha}_0^{(j)} \\ \tilde{\alpha}_1^{(j)} \\ \tilde{\alpha}_2^{(j)} \end{bmatrix}.$$

The optimization problem may be formulated as $$\min_{\tilde{\alpha}^{(j)}} \|X\tilde{\alpha}^{(j)} - y^{(j)}\|^2 \qquad (69)$$

The least squares solution of $\tilde{\alpha}^{(j)}$ is:

$$\tilde{\alpha}^{(j)} = (X^T X)^{-1} X^T y^{(j)} = \qquad (70)$$

$$(X^T X)^{-1} X^T X \left( \frac{1}{j-K+1} \sum_{f=K}^{j} \tilde{\alpha}_f \right) = \frac{1}{j-K+1} \sum_{f=K}^{j} \tilde{\alpha}_f$$

This indicates that averaging the polynomial coefficients is equivalent to averaging the polynomial curves and fitting a new polynomial to the average. The process may be simplified by the following averaging procedure:

$$\tilde{\alpha}_0^{(j)} = \frac{1}{j-K+1} \sum_{f=K}^{j} \tilde{\alpha}_{f,0} \qquad (71)$$

$$\tilde{\alpha}_1^{(j)} = \frac{1}{j-K+1} \sum_{f=K}^{j} \tilde{\alpha}_{f,1}$$

$$\tilde{\alpha}_2^{(j)} = \frac{1}{j-K+1} \sum_{f=K}^{j} \tilde{\alpha}_{f,2}$$

The derived polynomial as the chroma scaling factor may be directly applied. Since there are finite possibilities of luma value, the possible luma values may be used from the polynomial to build a 1D look-up table (LUT). The LUT may be determined as follows:

$$\rho_l^{(j)} = \tilde{f}^{(j)}(t_l) = \sum_{k=0}^{2} \tilde{\alpha}_k^{(j)} \cdot (t_l)^k \text{ for } l = 0, 1, \ldots, L-1 \qquad (72)$$

where $$t_l = \frac{2l+1}{2L}$$

and L may be 1024, or 2048, etc. depending on the precision. Note that L is a multiple of $(2*M_S)$.

Scale factors may be applied to the forward reshaping:

$$\hat{s}_{ji}^u = \rho_l^{(j)} \cdot (v_{ji}^u - 0.5) + 0.5, \qquad (73)$$

where $$l = \text{floor}(v_{ji}^y \cdot L), \text{ i.e., } \frac{2l-1}{2L} \leq v_{ji}^u < \frac{2l+1}{2L}. \qquad (74)$$

Or simply by taking the MSB of $v_{ji}^y$, which is the original EDR luma of pixel i in frame j.

Figure 9:
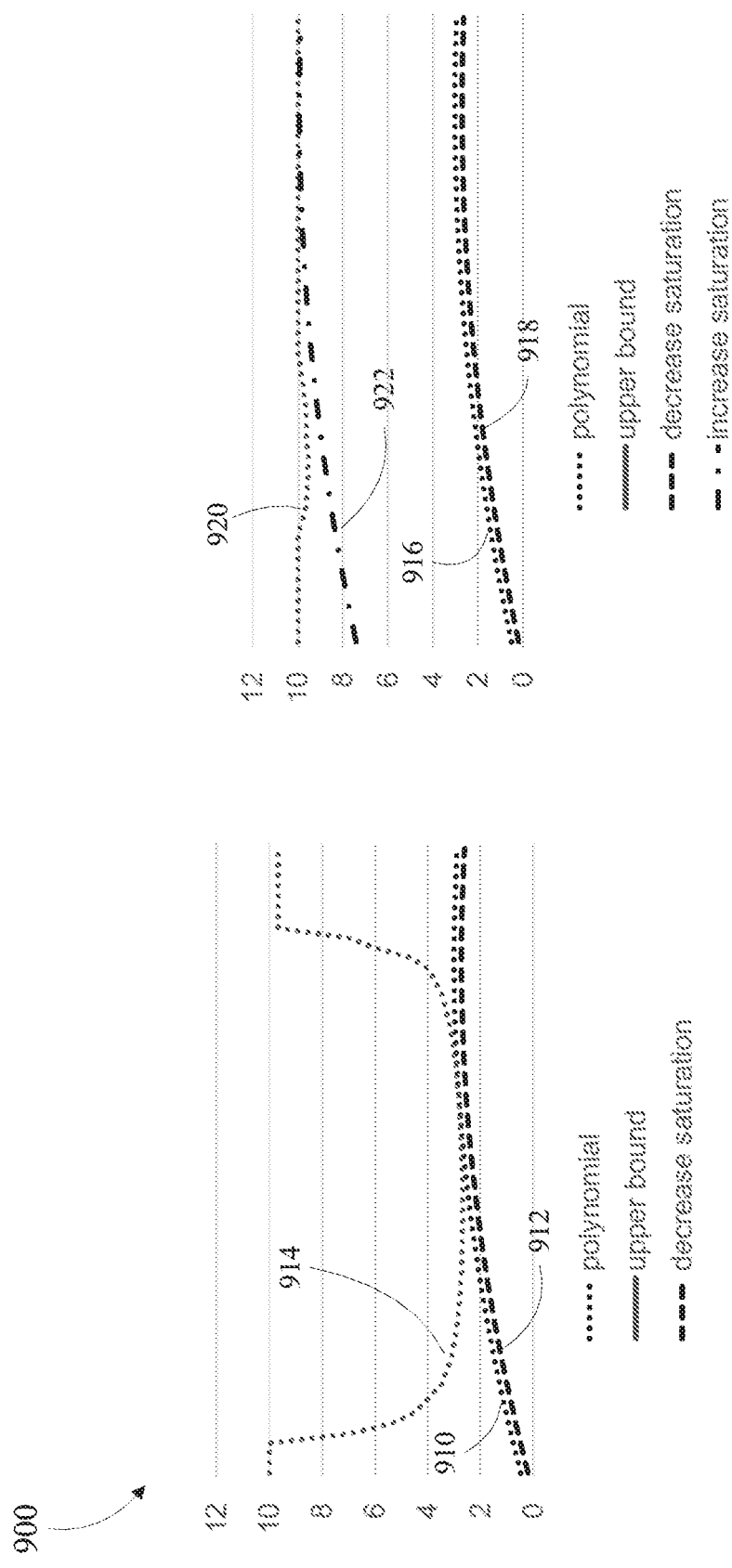
FIG. 9 depicts a shader control in accordance with an embodiment of the disclosure.

FIG. 9 depicts shader control 900 which allows the polynomial to be moved upward or downward as long as it satisfies the upper and lower bounds. The upper bound is shown as 914 having a polynomial 910 intersecting it, a decreased saturation 912 may be input to pull the polynomial slightly below the upper bound 914. The upper bound 920 may also allow an increased saturation of the polynomial 922 in addition to the decreased saturation 918 of the original polynomial 916.

Backward Reshaping Function

Three order chroma MMR with 2 inputs are utilized for backward reshaping:

$$\hat{v}_{ji}^u = m_{j,0} + m_{j,1}(\hat{s}_{ji}^y) + m_{j,2}(\hat{s}_{ji}^y)^2 + m_{j,3}(\hat{s}_{ji}^y)^3 + m_{j,4} (\hat{s}_{ji}^u) + m_{j,5}(\hat{s}_{ji}^u)^2 + m_{j,6}(\hat{s}_{ji}^u)^3 + m_{j,7}(\hat{s}_{ji}^y \cdot \hat{s}_{ji}^u) + m_{j,8} (\hat{s}_{ji}^y \cdot \hat{s}_{ji}^u)^2 + m_{j,9}(\hat{s}_{ji}^y \cdot \hat{s}_{ji}^u)^3 \qquad (75)$$

where $\hat{v}_{ji}^u$ is the backward reshaped EDR chroma (channel Cb) of pixel i in frame j. The chroma MMR coefficients $m_j = [m_{j,0} \ m_{j,1} \ldots m_{j,9}]^T$ are sought and will be stored and sent to the rpu.

With respect to backward reshaping function, at system initiation, the chroma MMR coefficients may be deduced for the reference forward reshaping polynomial. If there is no upper bound violation (i.e., if there is no violation of the SDR upper bounds by the reference forward reshaping polynomial), the reference polynomial coefficients may be used for forward reshaping, and the chroma reference MMR coefficients used for backward reshaping.

The coefficients $\{\alpha_{r,k}\}$ yield the scale factors:

$$f_r(x_n) = \sum_{k=0}^{2} \alpha_{r,k} \cdot (x_n)^k \text{ for } n = 0, 1, \ldots, M_S - 1 \text{ and} \qquad (76)$$

$$x_n = \frac{2n+1}{2M_S}.$$

An inverse scale factor of luma bins may be determined $$z_n = 1/f_r(x_n) \text{ for } n=0,1,\ldots,M_S-1. \qquad (77)$$

A curve fitting on the samples $\{z_n\}$ may be performed to get polynomial of order $K^B$:

$$g_r(x_n) = \sum_{k=0}^{K^B} \beta_{r,k} \cdot (x_n)^k \text{ the folowing may be set, } K^B = 6. \qquad (78)$$

Chroma MMR coefficients $m_r$ by $m_r = A\beta_r$ may be determined, where $\beta_r = [1 \ \beta_{r,0} \ \beta_{r,1} \ldots \beta_{r,K^B}]^T$ and A is the conversion matrix as specified in U.S. Provisional Application Ser. No. 62/338,638, "Chroma Reshaping for High Dynamic Range Images," by Q. Song et al., filed on May 19, 2016, (to be referred to as the '638 application), filed also as PCT Application Ser. No. PCT/US2017/033056, filed on May 17, 2017, which is incorporated herein by reference.

With respect to frames, if the resulting forward reshaping polynomial is the same as the reference polynomial, $m_r$ may be utilized as the chroma MMR coefficients.

Otherwise, if the forward reshaping polynomial may be different from the reference polynomial, the content-dependent chroma MMR coefficients may be utilized.

If we have obtained the EDR weights and SDR weights, the rightmost non-empty bin:

$$\hat{d} = \max_{n \in \Omega_j}(n)$$

may be found.

The bin index may be clipped by $d^{max}$: D=max ($\hat{d}$, $d^{max}$), where $d^{max}$ is a constant. The empirical value of $d^{max}$ is 50 when $M_S$=64.

Since D corresponds to the rightmost non-empty bin in the $M_S$ bins, down sampling the forward reshaping 1D LUT $\rho_l^{(j)}$ to $M_S$ samples may be performed:

$\hat{\rho}_d^{(j)} = \rho_l^{(j)}$, where $\hat{\rho}_d^{(j)}$ is the down-sampled 1D LUT, and where $$l = \frac{L(2d+1)}{2M_s}, \text{ and } d = 0, 1, \ldots, D, \quad (79)$$

and L may be a multiple of 2*$M_s$

Thus, the samples may be similar to the original samples, i.e., $\bar{x}_d \approx x_n$ for d=n, where $$\bar{x}_d = \frac{\frac{L(2d+1)}{2M_s}+1}{2L} = \frac{2d+1}{2M_s} + \frac{1}{2L}$$

The inverse scale factors may be determined:

$$z_d^{(j)} = \frac{1}{\hat{\rho}_d^{(j)}},$$

for d=0,1, ... ,D and $\hat{\rho}_d^{(j)}$ is the down-sampled 1D LUT. (80)

A curve fitting may be performed on the samples $\{z_d^{(j)}\}$ to get polynomial of order $K^B$:

$$g_j(x_d) = \sum_{k=0}^{K^B} \tilde{\beta}_k^{(j)} \cdot (\bar{x}_d)^k. \quad (81)$$

The optimization problem may be formulated as $$\min_{\tilde{\beta}^{(j)}} \|\hat{X}_{D^{(j)}} \tilde{\beta}^{(j)} - z^{(j)}\|^2 \quad (82)$$

where $$z^{(j)} = \begin{bmatrix} z_0^{(j)} \\ z_1^{(j)} \\ \vdots \\ z_{D^{(j)}}^{(j)} \end{bmatrix},$$

$$\hat{X}_{D^{(j)}} = \begin{bmatrix} 1 & x_0 & \ldots & (\bar{x}_0)^{K^B} \\ 1 & x_1 & \ldots & (\bar{x}_1)^{K^B} \\ \vdots & \vdots & \vdots & \vdots \\ 1 & x_{D^{(j)}} & \ldots & (\bar{x}_{D^{(j)}})^{K^B} \end{bmatrix},$$

-continued $$\tilde{\beta}^{(j)} = \begin{bmatrix} \tilde{\beta}_0^{(j)} \\ \tilde{\beta}_1^{(j)} \\ \vdots \\ \tilde{\beta}_{K^B}^{(j)} \end{bmatrix},$$

The least squares solution is $\tilde{\beta}^{(j)} = (\hat{X}_{D^{(j)}}^T \hat{X}_{D^{(j)}})^{-1} \hat{X}_{D^{(j)}}^T z^{(j)} = C_{D^{(j)}} z^{(j)}$, where $$C_{D^{(j)}} = (\hat{X}_{D^{(j)}}^T \hat{X}_{D^{(j)}})^{-1} \hat{X}_{D^{(j)}}^T \quad (83)$$

Note that $\hat{X}_{D^{(j)}}$ and $C_{D^{(j)}}$ depend on $D^{(j)}$. $C_{D^{(j)}}$ may be predetermined for $D^{(j)}$=50, ... , 64 at system initialization (i.e. 15 tables with ($K^B$+1)*64 dimension). Then for frames, $C_{D^{(j)}}$ is multiplied with $z^{(j)}$ to obtain $\tilde{\beta}^{(j)}$. Chroma MMR coefficients $m^{(j)}$ by $m^{(j)} = A\tilde{\beta}^{(j)}$ may be derived, where:

$\tilde{\beta}^{(j)} = [1\tilde{\beta}_0^{(j)}\tilde{\beta}_1^{(j)} \ldots \tilde{\beta}_{K^B}^{(j)}]^T$, where A is the conversion matrix. (84)

Such that conversion of the inverse scale factor, $z^{(j)}$, to the final chroma MMR coefficients, $m^{(j)}$, may be expressed as matrix conversion. The first part of equation (77) states that the MMR coefficients $m^{(j)}$ may be obtained by multiplying the central tendency reshaping function by a fixed conversion matrix $A\beta^{(j)}$, where $\tilde{\beta}^{(j)}$ are the polynomial coefficients. The second part of equation (77) states that a simplification may be made in determining the MMR coefficients $m^{(j)}$ in which inverse scale factor sample values $z^{(j)}$ may be multiplied by two conversion matrices $AC_{D^{(j)}}$.

$$m^{(j)} = A\tilde{\beta}^{(j)} = AC_{D^{(j)}} z^{(j)} \quad (85)$$

In a case where the EDR weights or SDR weights have not been determined, D may be set to $M_s$, and the MMR coefficients may be determined utilizing a procedure that is similar to the one described above.

Luma Modulated Chroma Forward Reshaping in a Second Device

Figure 10:
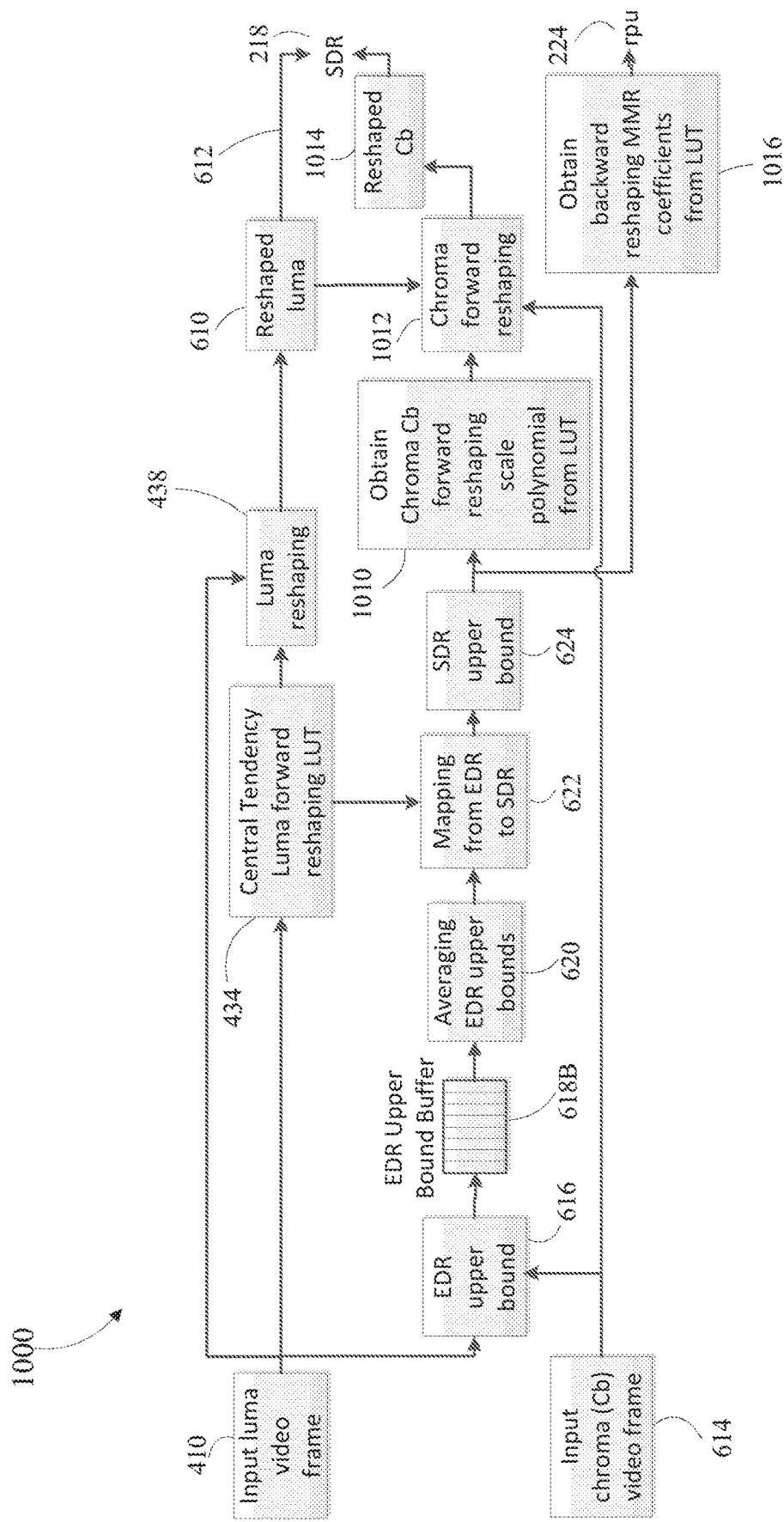
FIG. 10 depicts a third example chroma reshaping system in accordance with an embodiment of the disclosure.

FIG. 10 depicts a second example of chroma forward reshaping 1000 for Cb channel for a second device such as a mobile device. Cr channel can be performed in a similar way. In this example an input luma video frame 410 is input, a central tendency luma forward reshaping LUT 434 is determined as indicated previously and the luma undergoes reshaping 438 to yield a reshaped luma 610.

An input chroma video frame 614 is input. The EDR upper bounds, is performed by the extended dynamic range analyzer on the current frame, the at least one look-ahead frame (if any) and the at least one look-back frame (if any) within the statistical sliding window. The EDR upper bounds are determined 616 and collected in an EDR upper bound buffer 618B, the upper bounds are averaged 620 in this example, any process to determine a central trend may be utilized. Utilizing the central tendency luma forward reshaping LUT 434 and the averaged upper bounds from module 620 a mapping is performed from EDR to SDR, performed by the bridge mapper, 622 and SDR upper bounds are determined 624.

A chroma forward reshaping polynomial is determined from the forward reshaping scale polynomial LUT, performed by the chroma frame solver, 1010 utilizing the SDR upper bound output. Utilizing the chroma Cb forward reshaping polynomial output the chroma undergoes forward reshaping, performed by the chroma reshaper, 1012, resulting in a reshaped chroma 1014. The reshaped chroma output 1014 is combined with the reshaped luma output 612 to yield data in the SDR domain 218. Additionally the data from the SDR upper bound 624 may be used to obtain chroma MMR coefficients performed by the chroma MMR determiner, 1016 from that the backward LUT that may be sent to the RPU 224.

The polynomial coefficients may be obtained from a predetermined forward reshaping coefficient LUT to reduce complexity. The forward reshaping coefficient LUT may comprise coefficients at locations of Point B. An example of the construction of the forward coefficient LUT may be found specified in the '638 application. The index corresponding to the obtained Point B: (n*, T) may be found. The polynomial coefficients may be:

$$\tilde{\alpha}_k^{(j)} = \alpha(n^*,T,k), \text{ where } \alpha(\cdot,\cdot,\cdot) \text{ is the LUT.} \quad (86)$$

A 1D scale factor LUT may be built using the polynomial coefficients for frame j:

$$\rho_l^{(j)} = \sum_{k=0}^{2} \tilde{\alpha}_k^{(j)} \cdot (t_l)^k \text{ for } l = 0, 1, \ldots, L-1 \quad (72)$$

where $$t_l = \frac{2l+1}{2L}.$$

Scale factors may be applied to the forward reshaping:

$$\hat{s}_{ji}^u = \rho_l^{(j)} \cdot (v_{ji}^u - 0.5) + 0.5, \quad (73)$$

where $$l = \text{floor}(v_{ji}^y \cdot L), \text{ i.e., } \frac{2l-1}{2L} \le v_{ji}^u < \frac{2l+1}{2L}, \quad (74)$$

or simply by taking the MSB of $v_{ji}^y$, which is the original EDR luma of pixel i in frame j.

Backward Reshaping

With respect to backward reshaping, the chroma MMR coefficients may be found from the backward LUT. The backward LUT includes the chroma MMR coefficients of locations of Point B. The index may correspond to the obtained Point B: (n*,T). The chroma MMR coefficients may be $\tau(n^*,T,k)$ for k, where $\tau(\cdot,\cdot,\cdot)$ is the backward reshaping LUT. An example of the construction of the backward reshaping coefficient LUT may be found in the '638 application.

Saturation Control

After the polynomial coefficients of forward reshaping are obtained through the procedure described above, the shader may adjust the saturation manually. The shader may modify the constant coefficient $\tilde{\alpha}_0^{(j)}$ until the polynomial curve touches the upper bound or lower bound. The upper bound $\{\tilde{q}_n^{(j)}\}$ is defined in the above sections. The lower bound is set to $\delta$, where $\delta \ge 0$.

The procedure may be explained in the following:

$$\chi = \tilde{\alpha}_0^{(j)} + \delta, \delta \text{ may be any value (positive or negative or zero)}. \quad (87)$$

Scale factors may be obtained:

$$q_n^{(j)} = \chi + \tilde{\alpha}_1^{(j)} \cdot x_n + \tilde{\alpha}_2^{(j)} \cdot (x_n)^2, \text{ where the polynomial coefficients are } \tilde{\alpha}_k^{(j)} = \alpha(n^*,T,k) \text{ and where } \alpha (\cdot,\cdot,\cdot) \text{ is the LUT.} \quad (88)$$

If $q_n^{(j)} \le \tilde{q}_n^{(j)}$ for $n \in \Omega_j$ and $q_n^{(j)} > \sigma$ for $n=0, 1, \ldots, D$, $\tilde{\alpha}_0^{(j)}$ is replaced by $\chi$.

The chroma MMR coefficients may be resolved using the new polynomial coefficients. In one example δ was set to 0.2 to insure an adequate backward reshaped EDR.

If $q_n^{(j)}$ does not satisfy the conditions above, then $\tilde{\alpha}_0^{(j)}$ remains unchanged. The shader may have a slider to control the saturation.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs).

EEE 1. A method of real-time forward reshaping, comprising:
  selecting a statistical sliding window having a current frame, at least one look-back frame and at least one look-ahead frame, wherein the statistical sliding window indexes with the current frame;
  determining statistics of the current frame, the at least one look-back frame and at least one look-ahead frame within the statistical sliding window;
  including the at least one look-back frame in a current scene if the determined statistics of the at least one look-back frame and the current frame are within a predetermined threshold;
  excluding the at least one look-back frame from the current scene if the determined statistics of the at least one look-back frame and the current frame are greater than the predetermined threshold or if the at least one look-back frame is not within the statistical sliding window;
  including the at least one look-ahead frame in the current scene if the determined statistics of the at least one look-ahead frame and the current frame are within the predetermined threshold;
  excluding the at least one look-ahead frame from the current scene if the determined statistics of the at least one look-ahead frame and the current frame are greater than the predetermined threshold or if the at least one look-ahead frame is not within the statistical sliding window;
  determining at least one noise parameter based on the determined statistics of the current frame, the at least one look-back frame and the at least one look-ahead frame of those frames within the current scene;
  determining at least one luma transfer function based on the determined statistics of the current frame, the at least one look-back frame and the at least one look-ahead frame of those frames within the current scene;

determining at least one luma forward reshaping function based on the at least one luma transfer function and the at least one noise parameter within the current scene;
selecting a central tendency sliding window of the current frame and the at least one look-back frame if the at least one look-back frame is within the current scene; and
determining a central tendency luma forward reshaping function based on the at least one luma forward reshaping function of the central tendency sliding window.

EEE 2. The method of EEE 1 further comprising:
analyzing statistics for at least one of extended dynamic range (EDR) weights and EDR upper bounds of the current frame, the at least one look-back frame and at least one look-ahead frame within the statistical sliding window;
mapping the at least one of extended dynamic range (EDR) weights and the EDR upper bounds to a respective standard dynamic range (SDR) weights and SDR upper bounds based on the central tendency luma forward reshaping function;
determining a chroma frame solution comprising at least one chroma content-dependent polynomial;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

EEE 3. The method of EEE 2 wherein the generation of the set of chroma multivariate multiple regression (MMR) coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and SDR weights;
obtaining a central tendency chroma reshaping function;
determining a forward reshaping look-up-table (LUT) based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

EEE 4. The method of EEE 1 further comprising:
analyzing statistics for EDR upper bounds of the current frame, the at least one look-back frame and at least one look-ahead frame within the statistical sliding window;
mapping the EDR upper bounds to SDR upper bounds based on a central tendency of the EDR upper bounds and the central tendency luma forward reshaping function;
determining a chroma frame solution comprising at least one chroma content-dependent polynomial of the statistical sliding window; and
generating a set of chroma multivariate multiple regression coefficients based on the SDR upper bounds.

EEE 5. The method of EEE 4 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and a predefined forward coefficient LUT; and
determining the MMR coefficients based on the SDR upper bounds and a predefined backward coefficient LUT.

EEE 6. The method of EEE 1 further comprising:
analyzing statistics for extended dynamic range (EDR) upper bounds of the current frame, the at least one look-back frame and at least one look-ahead frame within the statistical sliding window;
mapping the EDR upper bounds to a respective standard dynamic range (SDR) upper bounds based on the central tendency luma forward reshaping function;
determining a chroma frame solution comprising at least one chroma content-dependent polynomial based on the SDR upper bounds;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

EEE 7. The method of EEE 6 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining a forward reshaping function based on the SDR upper bounds;
obtaining a central tendency chroma reshaping function;
determining a forward reshaping LUT based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

EEE 8. The method of EEE 1 further comprising:
analyzing statistics for at least one of extended dynamic range (EDR) weights and EDR upper bounds of the current frame and the at least one look-back frame within the statistical sliding window;
mapping the at least one of extended dynamic range (EDR) weights and the EDR upper bounds to a respective standard dynamic range (SDR) weights and SDR upper bounds based on the central tendency luma forward reshaping function;

determining a chroma frame solution comprising at least one chroma content-dependent polynomial;

determining a central tendency chroma forward reshaping polynomial based on the at least one chroma content-dependent polynomial of the statistical sliding window; and generating a set of chroma multivariate multiple regression coefficients based on the central tendency chroma forward reshaping polynomial.

EEE 9. The method of EEE 8 wherein the generation of the set of chroma multivariate multiple regression coefficients comprises:

if no upper bound violation exists;
  determining a forward reshaping function utilizing a default reference polynomial; and
  determining a set of default MMR coefficients corresponding to the forward reshaping function for backward reshaping;

if an upper bound violation exists;
  determining the forward reshaping function based on the SDR upper bounds and SDR weights;
  obtaining a central tendency chroma reshaping function;
  determining a forward reshaping LUT based on the central tendency chroma reshaping function;
  determining inverse scale factors from the forward reshaping LUT;
  determining an inverse polynomial based on the inverse scale factors;
  multiplying coefficients of the inverse polynomial by a fixed conversion matrix; and
  determining the MMR coefficients based on the multiplication for backward reshaping.

EEE 10. The method of EEE 1 further comprising:
  analyzing statistics for EDR upper bounds of the current frame and the at least one look-back frame within the statistical sliding window;
  mapping the EDR upper bounds to SDR upper bounds based on a central tendency of the EDR upper bounds and the central tendency luma forward reshaping function;
  determining a chroma frame solution comprising at least one chroma content-dependent polynomial of the statistical sliding window; and
  generating a set of chroma multivariate multiple regression coefficients based on the SDR upper bounds.

EEE 11. The method of EEE 10 wherein the generation of the set of chroma multivariate multiple regression coefficients comprises:

if no upper bound violation exists;
  determining a forward reshaping function utilizing a default reference polynomial; and
  determining a set of default MMR coefficients corresponding to the forward reshaping function for backward reshaping;

if an upper bound violation exists;
  determining the forward reshaping function based on the SDR upper bounds and a predefined forward coefficient LUT; and
  determining the MMR coefficients based on the SDR upper bounds and a predefined backward coefficient LUT.

EEE 12. The method of EEE 1 further comprising:
  analyzing statistics for extended dynamic range (EDR) upper bounds of the current frame and the at least one look-back frame within the statistical sliding window;
  mapping the EDR upper bounds to a respective standard dynamic range (SDR) upper bounds based on the central tendency luma forward reshaping function;
  determining a chroma frame solution comprising at least one chroma content-dependent polynomial based on the SDR upper bounds;
  determining a central tendency chroma forward reshaping polynomial based on the at least one chroma content-dependent polynomial of the statistical sliding window; and
  generating a set of chroma multivariate multiple regression coefficients based on the central tendency chroma forward reshaping polynomial.

EEE 13. The method of EEE 12 wherein the generation of the set of chroma multivariate multiple regression coefficients comprises:

if no upper bound violation exists;
  determining a forward reshaping function utilizing a default reference polynomial; and
  determining a set of default MMR coefficients corresponding to the forward reshaping function for backward reshaping;

if an upper bound violation exists;
  determining a forward reshaping function based on the SDR upper bounds;
  obtaining a central tendency chroma reshaping function;
  determining a forward reshaping LUT based on the central tendency chroma reshaping function;
  determining inverse scale factors from the forward reshaping LUT;
  determining an inverse polynomial based on the inverse scale factors;
  multiplying coefficients of the inverse polynomial by a fixed conversion matrix; and
  determining the MMR coefficients based on the multiplication for backward reshaping.

EEE 14. A method of real-time forward reshaping, comprising:
  selecting a statistical sliding window having a current frame and at least one look-back frame, wherein the statistical sliding window indexes with the current frame;
  determining statistics of the current frame and the at least one look-back frame within the statistical sliding window;
  including the at least one look-back frame in a current scene if the determined statistics of the at least one look-back frame and the current frame are within a predetermined threshold;
  excluding the at least one look-back frame from the current scene if the determined statistics of the at least one look-back frame and the current frame are greater than the predetermined threshold or if the at least one look-back frame is not within the statistical sliding window;
  determining at least one noise parameter based on the determined statistics of the current frame and the at least one look-back frame of those frames within the current scene;
  determining at least one luma transfer function based on the determined statistics of the current frame and the at least one look-back frame of those frames within the current scene;

determining at least one luma forward reshaping function based on the at least one luma transfer function and the at least one noise parameter within the current scene;
selecting a central tendency sliding window of the current frame and the at least one look-back frame if the at least one look-back frame is within the current scene; and
determining a central tendency luma forward reshaping function based on central tendencies of the at least one luma forward reshaping function within the scene.

EEE 15. The method of EEE 14 further comprising:
analyzing statistics for at least one of extended dynamic range (EDR) weights and EDR upper bounds of the current frame and the at least one look-back frame within the statistical sliding window;
mapping the at least one of extended dynamic range (EDR) weights and the EDR upper bounds to a respective standard dynamic range (SDR) weights and SDR upper bounds based on the central tendency luma forward reshaping function;
determining a chroma frame solution comprising at least one chroma content-dependent polynomial;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

EEE 16. The method of EEE 15 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and SDR weights;
obtaining a central tendency chroma reshaping function;
determining a forward reshaping LUT based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

EEE 17. The method of EEE 14 further comprising:
analyzing statistics for EDR upper bounds of the current frame and the at least one look-back frame within the statistical sliding window;
mapping the EDR upper bounds to SDR upper bounds based on a central tendency of the EDR upper bounds and the central tendency luma forward reshaping function;
determining a chroma frame solution comprising at least one chroma content-dependent polynomial of the statistical sliding window; and
generating a set of chroma multivariate multiple regression coefficients based on the SDR upper bounds.

EEE 18. The method of EEE 17 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and a predefined forward coefficient LUT; and
determining the MMR coefficients based on the SDR upper bounds and a predefined backward coefficient LUT.

EEE 19. The method of EEE 14 further comprising:
analyzing statistics for extended dynamic range (EDR) upper bounds of the current frame and the at least one look-back frame within the statistical sliding window;
mapping the EDR upper bounds to a respective standard dynamic range (SDR) upper bounds based on the central tendency luma forward reshaping function;
determining a chroma frame solution comprising at least one chroma content-dependent polynomial based on the SDR upper bounds;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

EEE 20. The method of EEE 19 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining a forward reshaping function based on the SDR upper bounds;
obtaining a central tendency chroma reshaping function;
determining a forward reshaping LUT based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

EEE 21. The method of EEE 14 further comprising:
analyzing statistics for at least one of extended dynamic range (EDR) weights and EDR upper bounds of the current frame, the at least one look-back frame and at least one look-ahead frame within the statistical sliding window;
mapping the at least one of extended dynamic range (EDR) weights and the EDR upper bounds to a respective standard dynamic range (SDR) weights and SDR upper bounds based on the central tendency luma forward reshaping function;
determining a chroma frame solution comprising at least one chroma content-dependent polynomial;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

EEE 22. The method of EEE 21 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and SDR weights;
obtaining a central tendency chroma reshaping function;
determining a forward reshaping LUT based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

EEE 23. The method of EEE 14 further comprising:
analyzing statistics for EDR upper bounds of the current frame, the at least one look-back frame and at least one look-ahead frame within the statistical sliding window;
mapping the EDR upper bounds to SDR upper bounds based on a central tendency of the EDR upper bounds and the central tendency luma forward reshaping function;
determining a chroma frame solution comprising at least one chroma content-dependent polynomial of the statistical sliding window; and
generating a set of chroma multivariate multiple regression coefficients based on the SDR upper bounds.

EEE 24. The method of EEE 23 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and a predefined forward coefficient LUT; and
determining the MMR coefficients based on the SDR upper bounds and a predefined backward coefficient LUT.

EEE 25. The method of EEE 14 further comprising:
analyzing statistics for extended dynamic range (EDR) upper bounds of the current frame, the at least one look-back frame and at least one look-ahead frame within the statistical sliding window;
mapping the EDR upper bounds to a respective standard dynamic range (SDR) upper bounds based on the central tendency luma forward reshaping function;
determining a chroma frame solution comprising at least one chroma content-dependent polynomial based on the SDR upper bounds;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

EEE 26. The method of EEE 25 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining a forward reshaping function based on the SDR upper bounds;
obtaining a central tendency chroma reshaping function;
determining a forward reshaping LUT based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

What is claimed is:

1. A method of real-time forward reshaping, wherein the forward reshaping comprises mapping from an extended dynamic range (EDR) to a standard dynamic range (SDR) the method comprising:
selecting a statistical sliding window having a current frame, at least one look-back frame and at least one look-ahead frame, wherein the statistical sliding window indexes with the current frame;
determining statistics of the current frame, the at least one look-back frame and at least one look-ahead frame within the statistical sliding window;
including the at least one look-back frame in a current scene if the determined statistics of the at least one look-back frame and the current frame are within a predetermined threshold;
excluding the at least one look-back frame from the current scene if the determined statistics of the at least one look-back frame and the current frame are greater than the predetermined threshold or if the at least one look-back frame is not within the statistical sliding window;
including the at least one look-ahead frame in the current scene if the determined statistics of the at least one look-ahead frame and the current frame are within the predetermined threshold;
excluding the at least one look-ahead frame from the current scene if the determined statistics of the at least one look-ahead frame and the current frame are greater than the predetermined threshold or if the at least one look-ahead frame is not within the statistical sliding window;
determining at least one noise parameter based on the determined statistics of the current frame, the at least one look-back frame and the at least one look-ahead frame of those frames within the current scene, wherein the at least one noise parameter is determined based on an average of block-based standard deviations within the statistical sliding window;
determining at least one luma transfer function based on the determined statistics of the current frame, the at least one look-back frame and the at least one look-ahead frame of those frames within the current scene, wherein the at least one luma transfer function is constructed using dynamic tone mapping, DTM, based on the determined statistics;
determining at least one luma forward reshaping function based on the at least one luma transfer function and the at least one noise parameter within the current scene, wherein said determining comprises re-allocating a bit depth among input codewords of the at least one luma transfer function based on the at least one noise parameter;
selecting a central tendency sliding window of the current frame and the at least one look-back frame if the at least one look-back frame is within the current scene; and
determining a central tendency luma forward reshaping function based on the at least one luma forward reshaping function of the central tendency sliding window.

2. The method of claim 1 wherein the determined statistics include a maximum level of maximal values within the statistical sliding window, a minimum level of minimal values within the statistical sliding window, and a mean level of average values within the statistical sliding window.

3. The method of claim 1, wherein the at least one luma transfer function is further constructed based on a given slope, a given offset, and a given power.

4. The method of claim 1 wherein the central tendency luma reshaping function is determined by averaging over luma forward reshaping functions for the current frame and the at least one look-back frame of the central tendency sliding window.

5. The method of claim 1 further comprising:
analyzing statistics for at least one of extended dynamic range (EDR) weights and EDR upper bounds of the current frame, the at least one look-back frame and at least one look-ahead frame within the statistical sliding window;
mapping the at least one of EDR weights and the EDR upper bounds to respective standard dynamic range (SDR) weights and SDR upper bounds based on the central tendency luma forward reshaping function;
determining at least one chroma content-dependent polynomial based on the respective SDR weights and SDR upper bounds;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

6. The method of claim 5 wherein the generation of the set of chroma multivariate multiple regression (MMR) coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and SDR weights;
obtaining a central tendency chroma reshaping function;
determining a forward reshaping look-up-table (LUT) based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

7. The method of claim 1 further comprising:
analyzing statistics for EDR upper bounds of the current frame, the at least one look-back frame and at least one look-ahead frame within the statistical sliding window;
mapping the EDR upper bounds to SDR upper bounds based on a central tendency of the EDR upper bounds and the central tendency luma forward reshaping function;
determining at least one chroma content-dependent polynomial of the statistical sliding window; and
generating a set of chroma multivariate multiple regression coefficients based on the SDR upper bounds.

8. The method of claim 7 wherein the generation of the set of chroma multivariate multiple regression coefficients comprises:
if no upper bound violation exists;
determining a forward reshaping function utilizing a default reference polynomial; and
determining a set of default MMR coefficients corresponding to the forward reshaping function for backward reshaping;
if an upper bound violation exists;
determining the forward reshaping function based on the SDR upper bounds and a predefined forward coefficient LUT; and
determining the MMR coefficients based on the SDR upper bounds and a predefined backward coefficient LUT.

9. The method of claim 1 further comprising:
analyzing statistics for extended dynamic range (EDR) upper bounds of the current frame, the at least one look-back frame and at least one look-ahead frame within the statistical sliding window;
mapping the EDR upper bounds to a respective standard dynamic range (SDR) upper bounds based on the central tendency luma forward reshaping function;
determining at least one chroma content-dependent polynomial based on the SDR upper bounds;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

10. The method of claim 9 wherein the generation of the set of chroma multivariate multiple regression coefficients comprises:
  if no upper bound violation exists;
    determining a forward reshaping function utilizing a default reference polynomial; and
    determining a set of default MMR coefficients corresponding to the forward reshaping function for backward reshaping;
  if an upper bound violation exists;
    determining a forward reshaping function based on the SDR upper bounds;
    obtaining a central tendency chroma reshaping function;
    determining a forward reshaping LUT based on the central tendency chroma reshaping function;
    determining inverse scale factors from the forward reshaping LUT;
    determining an inverse polynomial based on the inverse scale factors;
    multiplying coefficients of the inverse polynomial by a fixed conversion matrix; and
    determining the MMR coefficients based on the multiplication for backward reshaping.

11. The method of claim 1 further comprising:
  analyzing statistics for at least one of extended dynamic range (EDR) weights and EDR upper bounds of the current frame and the at least one look-back frame within the statistical sliding window;
  mapping the at least one of extended dynamic range (EDR) weights and the EDR upper bounds to respective standard dynamic range (SDR) weights and SDR upper bounds based on the central tendency luma forward reshaping function;
  determining at least one chroma content-dependent polynomial based on the respective SDR weights and SDR upper bounds;
  determining a central tendency chroma forward reshaping polynomial based on the at least one chroma content-dependent polynomial of the statistical sliding window; and
  generating a set of chroma multivariate multiple regression coefficients based on the central tendency chroma forward reshaping polynomial.

12. The method of claim 11 wherein the generation of the set of chroma multivariate multiple regression coefficients comprises:
  if no upper bound violation exists;
    determining a forward reshaping function utilizing a default reference polynomial; and
    determining a set of default MMR coefficients corresponding to the forward reshaping function for backward reshaping;
  if an upper bound violation exists;
    determining the forward reshaping function based on the SDR upper bounds and SDR weights;
    obtaining a central tendency chroma reshaping function;
    determining a forward reshaping LUT based on the central tendency chroma reshaping function;
    determining inverse scale factors from the forward reshaping LUT;
    determining an inverse polynomial based on the inverse scale factors;
    multiplying coefficients of the inverse polynomial by a fixed conversion matrix; and
    determining the MMR coefficients based on the multiplication for backward reshaping.

13. The method of claim 1 further comprising:
  analyzing statistics for EDR upper bounds of the current frame and the at least one look-back frame within the statistical sliding window;
  mapping the EDR upper bounds to SDR upper bounds based on a central tendency of the EDR upper bounds and the central tendency luma forward reshaping function;
  determining at least one chroma content-dependent polynomial of the statistical sliding window; and
  generating a set of chroma multivariate multiple regression coefficients based on the SDR upper bounds.

14. The method of claim 13 wherein the generation of the set of chroma multivariate multiple regression coefficients comprises:
  if no upper bound violation exists;
    determining a forward reshaping function utilizing a default reference polynomial; and
    determining a set of default MMR coefficients corresponding to the forward reshaping function for backward reshaping;
  if an upper bound violation exists;
    determining the forward reshaping function based on the SDR upper bounds and a predefined forward coefficient LUT; and
    determining the MMR coefficients based on the SDR upper bounds and a predefined backward coefficient LUT.

15. The method of claim 1 further comprising:
  analyzing statistics for extended dynamic range (EDR) upper bounds of the current frame and the at least one look-back frame within the statistical sliding window;
  mapping the EDR upper bounds to respective standard dynamic range (SDR) upper bounds based on the central tendency luma forward reshaping function;
  determining at least one chroma content-dependent polynomial based on the SDR upper bounds;
  determining a central tendency chroma forward reshaping polynomial based on the at least one chroma content-dependent polynomial of the statistical sliding window; and
  generating a set of chroma multivariate multiple regression coefficients based on the central tendency chroma forward reshaping polynomial.

16. The method of claim 15 wherein the generation of the set of chroma multivariate multiple regression coefficients comprises:
  if no upper bound violation exists;
    determining a forward reshaping function utilizing a default reference polynomial; and
    determining a set of default MMR coefficients corresponding to the forward reshaping function for backward reshaping;
  if an upper bound violation exists;
    determining a forward reshaping function based on the SDR upper bounds;
    obtaining a central tendency chroma reshaping function;
    determining a forward reshaping LUT based on the central tendency chroma reshaping function;
    determining inverse scale factors from the forward reshaping LUT;
    determining an inverse polynomial based on the inverse scale factors;

multiplying coefficients of the inverse polynomial by a fixed conversion matrix; and determining the MMR coefficients based on the multiplication for backward reshaping.

17. A method of real-time forward reshaping, wherein the forward reshaping comprises mapping from an extended dynamic range (EDR) to a standard dynamic range (SDR) the method comprising:

selecting a statistical sliding window having a current frame and at least one look-back frame, wherein the statistical sliding window indexes with the current frame;

determining statistics of the current frame and the at least one look-back frame within the statistical sliding window;

including the at least one look-back frame in a current scene if the determined statistics of the at least one look-back frame and the current frame are within a predetermined threshold;

excluding the at least one look-back frame from the current scene if the determined statistics of the at least one look-back frame and the current frame are greater than the predetermined threshold or if the at least one look-back frame is not within the statistical sliding window;

determining at least one noise parameter based on the determined statistics of the current frame and the at least one look-back frame of those frames within the current scene, wherein the at least one noise parameter is determined based on an average of block-based standard deviations within the statistical sliding window;

determining at least one luma transfer function based on the determined statistics of the current frame and the at least one look-back frame of those frames within the current scene, wherein the at least one luma transfer function is constructed using dynamic tone mapping, DTM, based on the determined statistics;

determining at least one luma forward reshaping function based on the at least one luma transfer function and the at least one noise parameter within the current scene, wherein said determining comprises re-allocating a bit depth among input codewords of the at least one luma transfer function based on the at least one noise parameter;

selecting a central tendency sliding window of the current frame and the at least one look-back frame if the at least one look-back frame is within the current scene; and determining a central tendency luma forward reshaping function based on central tendencies of the at least one luma forward reshaping function within the scene.

18. The method claim 17 wherein the determined statistics include a maximum level of maximal values within the statistical sliding window, a minimum level of minimal values within the statistical sliding window, and a mean level of average values within the statistical sliding window.

19. The method of claim 17, wherein the at least one luma transfer function is further constructed based on a given slope, a given offset, and a given power.

20. The method of claim 17 wherein the central tendency luma reshaping function is determined by averaging over luma forward reshaping functions for the current frame and the at least one look-back frame of the central tendency sliding window.

21. The method of claim 17 further comprising:
analyzing statistics for at least one of extended dynamic range (EDR) weights and EDR upper bounds of the current frame and the at least one look-back frame within the statistical sliding window;

mapping the at least one of extended dynamic range (EDR) weights and the EDR upper bounds to a respective standard dynamic range (SDR) weights and SDR upper bounds based on the central tendency luma forward reshaping function;

determining at least one chroma content-dependent polynomial based on the respective SDR weights and SDR upper bounds;

determining a central tendency chroma forward reshaping polynomial based on the at least one chroma content-dependent polynomial of the statistical sliding window; and generating a set of chroma multivariate multiple regression coefficients based on the central tendency chroma forward reshaping polynomial.

22. The method of claim 21 wherein the generation of the set of chroma multivariate multiple regression coefficients comprises:

if no upper bound violation exists;
determining a forward reshaping function utilizing a default reference polynomial; and
determining a set of default MMR coefficients corresponding to the forward reshaping function for backward reshaping;

if an upper bound violation exists;
determining the forward reshaping function based on the SDR upper bounds and SDR weights;
obtaining a central tendency chroma reshaping function;
determining a forward reshaping LUT based on the central tendency chroma reshaping function;
determining inverse scale factors from the forward reshaping LUT;
determining an inverse polynomial based on the inverse scale factors;
multiplying coefficients of the inverse polynomial by a fixed conversion matrix; and
determining the MMR coefficients based on the multiplication for backward reshaping.

23. The method of claim 17 further comprising:
analyzing statistics for EDR upper bounds of the current frame and the at least one look-back frame within the statistical sliding window;
mapping the EDR upper bounds to SDR upper bounds based on a central tendency of the EDR upper bounds and the central tendency luma forward reshaping function;
determining at least one chroma content-dependent polynomial of the statistical sliding window; and
generating a set of chroma multivariate multiple regression coefficients based on the at least one chroma content-dependent polynomial and the SDR upper bounds.

24. The method of claim 23 wherein the generation of the set of chroma multivariate multiple regression coefficients comprises:

if no upper bound violation exists;
determining a forward reshaping function utilizing a default reference polynomial; and
determining a set of default MMR coefficients corresponding to the forward reshaping function for backward reshaping;

if an upper bound violation exists;
    determining the forward reshaping function based on the SDR upper bounds and a predefined forward coefficient LUT; and
    determining the MMR coefficients based on the SDR upper bounds and a predefined backward coefficient LUT.

25. The method of claim 17 further comprising:
analyzing statistics for extended dynamic range (EDR) upper bounds of the current frame and the at least one look-back frame within the statistical sliding window;
mapping the EDR upper bounds to respective standard dynamic range (SDR) upper bounds based on the central tendency luma forward reshaping function;
determining at least one chroma content-dependent polynomial based on the SDR upper bounds;
determining a central tendency chroma forward reshaping polynomial based on the at least one chroma content-dependent polynomial of the statistical sliding window based on the respective SDR upper bounds; and
generating a set of chroma multivariate multiple regression coefficients based on the central tendency chroma forward reshaping polynomial.

26. The method of claim 25 wherein the generation of the set of chroma multivariate multiple regression coefficients comprises:
if no upper bound violation exists;
    determining a forward reshaping function utilizing a default reference polynomial; and
    determining a set of default MMR coefficients corresponding to the forward reshaping function for backward reshaping;
if an upper bound violation exists;
    determining a forward reshaping function based on the SDR upper bounds;
    obtaining a central tendency chroma reshaping function;
    determining a forward reshaping LUT based on the central tendency chroma reshaping function;
    determining inverse scale factors from the forward reshaping LUT;
    determining an inverse polynomial based on the inverse scale factors;
    multiplying coefficients of the inverse polynomial by a fixed conversion matrix; and
    determining the MMR coefficients based on the multiplication for backward reshaping.

27. The method of claim 17 further comprising:
analyzing statistics for at least one of extended dynamic range (EDR) weights and EDR upper bounds of the current frame, the at least one look-back frame and at least one look-ahead frame within the statistical sliding window;
mapping the at least one of extended dynamic range (EDR) weights and the EDR upper bounds to respective standard dynamic range (SDR) weights and SDR upper bounds based on the central tendency luma forward reshaping function;
determining at least one chroma content-dependent polynomial based on the respective SDR weights and SDR upper bounds;
determining a central tendency chroma forward reshaping polynomial based on the at least one chroma content-dependent polynomial of the statistical sliding window; and
generating a set of chroma multivariate multiple regression coefficients based on the central tendency chroma forward reshaping polynomial.

28. The method of claim 27 wherein the generation of the set of chroma multivariate multiple regression coefficients comprises:
if no upper bound violation exists;
    determining a forward reshaping function utilizing a default reference polynomial; and
    determining a set of default MMR coefficients corresponding to the forward reshaping function for backward reshaping;
if an upper bound violation exists;
    determining the forward reshaping function based on the SDR upper bounds and SDR weights;
    obtaining a central tendency chroma reshaping function;
    determining a forward reshaping LUT based on the central tendency chroma reshaping function;
    determining inverse scale factors from the forward reshaping LUT;
    determining an inverse polynomial based on the inverse scale factors;
    multiplying coefficients of the inverse polynomial by a fixed conversion matrix; and
    determining the MMR coefficients based on the multiplication for backward reshaping.

29. The method of claim 17 further comprising:
analyzing statistics for EDR upper bounds of the current frame, the at least one look-back frame and at least one look-ahead frame within the statistical sliding window;
mapping the EDR upper bounds to SDR upper bounds based on a central tendency of the EDR upper bounds and the central tendency luma forward reshaping function;
determining at least one chroma content-dependent polynomial of the statistical sliding window; and
generating a set of chroma multivariate multiple regression coefficients based on the SDR upper bounds.

30. The method of claim 29 wherein the generation of the set of chroma multivariate multiple regression coefficients comprises:
if no upper bound violation exists;
    determining a forward reshaping function utilizing a default reference polynomial; and
    determining a set of default MMR coefficients corresponding to the forward reshaping function for backward reshaping;
if an upper bound violation exists;
    determining the forward reshaping function based on the SDR upper bounds and a predefined forward coefficient LUT; and
    determining the MMR coefficients based on the SDR upper bounds and a predefined backward coefficient LUT.

31. The method of claim 17 further comprising:
analyzing statistics for extended dynamic range (EDR) upper bounds of the current frame, the at least one look-back frame and at least one look-ahead frame within the statistical sliding window;
mapping the EDR upper bounds to respective standard dynamic range (SDR) upper bounds based on the central tendency luma forward reshaping function;
determining at least one chroma content-dependent polynomial based on the SDR upper bounds;

determining a central tendency chroma forward reshaping polynomial based on the at least one chroma content-dependent polynomial of the statistical sliding window; and generating a set of chroma multivariate multiple regression coefficients based on the central tendency chroma forward reshaping polynomial.

32. The method of claim 31 wherein the generation of the set of chroma multivariate multiple regression coefficients comprises:

if no upper bound violation exists;
  determining a forward reshaping function utilizing a default reference polynomial; and
  determining a set of default MMR coefficients corresponding to the forward reshaping function for backward reshaping;

if an upper bound violation exists;
  determining a forward reshaping function based on the SDR upper bounds;
  obtaining a central tendency chroma reshaping function;
  determining a forward reshaping LUT based on the central tendency chroma reshaping function;
  determining inverse scale factors from the forward reshaping LUT;
  determining an inverse polynomial based on the inverse scale factors;
  multiplying coefficients of the inverse polynomial by a fixed conversion matrix; and
  determining the MMR coefficients based on the multiplication for backward reshaping.

* * * * *